US008891362B2

(12) United States Patent
Olsson et al.

(10) Patent No.: US 8,891,362 B2
(45) Date of Patent: Nov. 18, 2014

(54) SCHEDULING FOR ACCESS DIVISION MULTIPLEXING

(75) Inventors: Magnus Olsson, Stockholm (SE); Göran Rune, Linköping (SE); Per Synnergren, Luleå (SE); Erik Westerberg, Enskede (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 282 days.

(21) Appl. No.: 12/943,504

(22) Filed: Nov. 10, 2010

(65) Prior Publication Data

US 2011/0149925 A1   Jun. 23, 2011

Related U.S. Application Data

(60) Provisional application No. 61/287,575, filed on Dec. 17, 2009, provisional application No. 61/287,623, filed on Dec. 17, 2009, provisional application No. 61/287,438, filed on Dec. 17, 2009, provisional application No. 61/287,627, filed on Dec. 17, 2009, provisional application No. 61/287,630, filed on Dec. 17, 2009, provisional application No. 61/287,954, filed on Dec. 18, 2009.

(51) Int. Cl.
```
H04W 72/00     (2009.01)
H04W 72/12     (2009.01)
H04W 60/00     (2009.01)
H04W 36/00     (2009.01)
H04W 88/06     (2009.01)
H04W 76/04     (2009.01)
```

(52) U.S. Cl.
CPC ........ *H04W 60/005* (2013.01); *H04W 36/0022* (2013.01); *H04W 88/06* (2013.01); *H04W 72/1215* (2013.01); *H04W 76/045* (2013.01)
USPC ............................. 370/229; 370/252; 370/329

(58) Field of Classification Search
USPC ......... 370/229, 230, 235, 252, 254, 328, 329, 370/338, 341, 395.4, 431, 437, 442–447, 370/458–462, 466, 468; 455/552.1
See application file for complete search history.

(56) References Cited

U.S. PATENT DOCUMENTS 6,122,270 A    9/2000   Whinnett et al.
6,463,054 B1   10/2002  Mazur et al.
(Continued)

FOREIGN PATENT DOCUMENTS

EP    1740007 A1    1/2007
EP    2197236 A1    6/2010
(Continued)

OTHER PUBLICATIONS

3GPP TS 24.008, V10.1.0; 3rd Generation Partnership Project; Technical Specification Group Core Network and Terminals; Mobile Radio Interface Layer 3 Specification; Core Network Protocols; Stage 3 (Release 10); Dec. 2010.

(Continued)

*Primary Examiner* — Yemane Mesfin
*Assistant Examiner* — Mon Cheri Davenport
(74) *Attorney, Agent, or Firm* — Withrow & Terranova, PLLC

(57) ABSTRACT

Scheduling map(s) are generated and updated for employment in an access division multiplexing (ADM) environment for allocating resource utilization (e.g., use of transmission time intervals) to or between differing radio access technology networks, and particularly to a Long Term Evolution (LTE) network and a Global System for Mobile communication (GSM) network. In some example embodiments the scheduling map(s), apparatus, and methods hereof are implemented in a wireless terminal which participates in access division multiplexing between the differing radio access technologies, in other example embodiments the scheduling map (s), apparatus, and methods hereof are implemented in a network node (e.g., eNodeB) of one of the radio access technology networks, e.g., the Long Term Evolution (LTE) network.

16 Claims, 15 Drawing Sheets

(56) References Cited

U.S. PATENT DOCUMENTS

| | | | |
|---|---|---|---|
| 6,560,457 B1 | 5/2003 | Silver et al. | |
| 6,608,832 B2 | 8/2003 | Forslow | |
| 6,751,472 B1 | 6/2004 | Muhonen | |
| 6,904,058 B2 | 6/2005 | He et al. | |
| 7,171,216 B1 | 1/2007 | Choksi | |
| 7,463,901 B2 | 12/2008 | Svedberg et al. | |
| 8,045,985 B2 | 10/2011 | Ahn | |
| 8,107,433 B2 | 1/2012 | Jokinen | |
| 8,107,954 B2 | 1/2012 | Islam et al. | |
| 8,125,960 B2 | 2/2012 | Iwamura et al. | |
| 8,144,696 B2 | 3/2012 | Kallio et al. | |
| 8,219,085 B2 | 7/2012 | Mittal et al. | |
| 8,320,291 B2 | 11/2012 | Rune et al. | |
| 8,358,629 B2 | 1/2013 | Grilli et al. | |
| 8,537,748 B2 | 9/2013 | Witzel et al. | |
| 8,559,417 B2 | 10/2013 | Yun et al. | |
| 8,594,074 B2 | 11/2013 | Olsson et al. | |
| 2003/0109256 A1 | 6/2003 | Holcman | |
| 2004/0043793 A1 | 3/2004 | Sakata | |
| 2004/0184439 A1 | 9/2004 | Blanc et al. | |
| 2005/0043046 A1 | 2/2005 | Lee | |
| 2006/0073831 A1 | 4/2006 | Guyot et al. | |
| 2007/0207824 A1 | 9/2007 | Bhattacharjee et al. | |
| 2008/0037515 A1 | 2/2008 | Sander | |
| 2008/0194264 A1 | 8/2008 | Ekert et al. | |
| 2008/0298353 A1 | 12/2008 | Zhu et al. | |
| 2009/0010247 A1 | 1/2009 | Stille | |
| 2009/0036131 A1 | 2/2009 | Diachina et al. | |
| 2009/0086674 A1 | 4/2009 | Ejzak | |
| 2009/0238143 A1 | 9/2009 | Mukherjee et al. | |
| 2009/0276532 A1 | 11/2009 | Bishop | |
| 2009/0285157 A1 | 11/2009 | Yeoum et al. | |
| 2010/0080171 A1 | 4/2010 | Rune et al. | |
| 2010/0085962 A1 | 4/2010 | Issaeva et al. | |
| 2010/0098023 A1 | 4/2010 | Aghili et al. | |
| 2010/0113010 A1 | 5/2010 | Tenny et al. | |
| 2010/0135200 A1 | 6/2010 | Karaoguz et al. | |
| 2010/0172329 A1 | 7/2010 | Yokoyama et al. | |
| 2010/0173667 A1* | 7/2010 | Hui et al. | 455/552.1 |
| 2010/0177669 A1* | 7/2010 | Suo et al. | 370/280 |
| 2010/0202413 A1 | 8/2010 | Vikberg et al. | |
| 2010/0234026 A1 | 9/2010 | Tenny et al. | |
| 2011/0110326 A1 | 5/2011 | Rexhepi et al. | |
| 2011/0122864 A1 | 5/2011 | Cherifi et al. | |
| 2011/0134882 A1 | 6/2011 | Aoyama et al. | |
| 2011/0149852 A1 | 6/2011 | Olsson et al. | |
| 2011/0149853 A1 | 6/2011 | Olsson et al. | |
| 2011/0149907 A1 | 6/2011 | Olsson et al. | |
| 2011/0149908 A1 | 6/2011 | Olsson et al. | |
| 2011/0149925 A1 | 6/2011 | Olsson et al. | |
| 2011/0151874 A1 | 6/2011 | Olsson et al. | |
| 2012/0113900 A1 | 5/2012 | Shaheen | |
| 2013/0017805 A1 | 1/2013 | Jonsson et al. | |

FOREIGN PATENT DOCUMENTS

| | | |
|---|---|---|
| WO | 0101720 A1 | 1/2001 |
| WO | 0182637 A1 | 11/2001 |
| WO | 2004057894 A1 | 7/2004 |
| WO | 2008/088245 A1 | 7/2008 |
| WO | 2008087518 A2 | 7/2008 |
| WO | 2008088243 | 7/2008 |
| WO | 2008088245 A1 | 7/2008 |
| WO | 2008088258 A1 | 7/2008 |
| WO | 2008/148432 A1 | 12/2008 |
| WO | 2009000696 A1 | 12/2008 |
| WO | 2009044458 A1 | 4/2009 |
| WO | 2009/087099 A1 | 7/2009 |
| WO | 2009/084146 A1 | 9/2009 |
| WO | 2010146468 A2 | 12/2010 |
| WO | 2011073847 A2 | 6/2011 |
| WO | 2011073847 A3 | 6/2011 |
| WO | 2011073849 A1 | 6/2011 |
| WO | 2011073884 A1 | 6/2011 |
| WO | 2011073910 A1 | 6/2011 |
| WO | 2011073913 A1 | 6/2011 |
| WO | 2011073946 A1 | 6/2011 |

OTHER PUBLICATIONS

International Search Report and Written Opinion mailed Apr. 26, 2011 in PCT application PCT/IB2010/055609.

3GPP TS 36.331 V8.9.0; Technical Specification Group Radio Access Network; Evolved Universal Terrestrial Radio Access (E-UTRA); Radio Resource Control (RRC); Protocol Specification (Release 8) (Mar. 2010).

International Search Report and Written Opinion mailed May 18, 2011 in PCT application PCT/IB2010/055816.

International Search Report and Written Opinion mailed May 17, 2011 in PCT application PCT/IB2010/055820.

International Search Report and Written Opinion mailed May 18, 2011 in PCT application PCT/IB2010/055888.

International Search Report and Written Opinion mailed Jun. 15, 2011 in PCT application PCT/IB2010/055601.

International Search Report and Written Opinion mailed May 13, 2011 in PCT application PCT/IB2010/055778.

3GPP TS 36.331 V10.1.0 3rd Generation Partnership Project; Evolved Universal Terrestrial Radio Access (E-UTRA); Radio Resource Control (RRC); Protocol Specification (Release 10) (Mar. 2011).

3GPP TS 23.272 V10.3.1, 3rd Generation Partnership Project; Technical Specification Group Services and System Aspects; Circuit Switched (CS) fallback in Evolved Packet System (EPS); Stage 2 (Release 10) (Apr. 2011).

General Packet Radio Service (GPRS) enhancements for Evolved Universal Terrestrial Radio Access Network (E-UTRAN) access, 3GPP Technical Specification, Mar. 2011, V10.3.0.

3GPP TS 25.331 V10.3.1, 3rd Generation Partnership Project; Technical Specification Group Radio Access Network; Radio Resource Control (RRC); Protocol Specification (Release 10) (Apr. 2011).

3GPP TS 23.272 V8.4.0, Digital Cellular Telecommunications System (Phase 2+); Universal Mobile Telecommunications System (UMTS); LTE; Circuit Switched (CS) Fallback in Evolved Packet System (EPS); Stage 2 (Release 8) Jun. 1, 2009.

U.S. Appl. No. 13/180,195, filed Jul. 11, 2011, entitled "Method and Apparatus for Transferring Telecommunications Connections".

Office Action mailed Jul. 12, 2013 in U.S. Appl. No. 12/943,801.

Office Action mailed Nov. 12, 2013 in U.S. Appl. No. 13/180,195.

Office Action mailed Dec. 11, 2012 in U.S. Appl. No. 12/943,770.

Office Action mailed Oct. 1, 2012 in U.S. Appl. No. 12/943,801.

Office Action mailed Nov. 19, 2012 in U.S. Appl. No. 12/943,612.

Office Action mailed Oct. 5, 2012 in U.S. Appl. No. 12/943,736.

Office Action mailed May 31, 2013 in U.S. Appl. No. 12/943,612.

Notice of Allowance mailed May 15, 2013 in U.S. Appl. No. 12/943,736.

U.S. Office Action mailed Mar. 6, 2013 in U.S. Appl. No. 12/943,685.

3GPP TS 23.272, "3rd Generation Partnership Project; Technical Specification Group Services and System Aspects; Circuit Switched (CS) fallback in Evolved Packet System (EPS); Stage 2 (Release 10)," V10.4.0, 3GPP Organizational Partners, Jun. 2011, 78 pages.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10.4.0, 3GPP Organizational Partners, Jun. 2011, 281 pages.

3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 10)," V10. 3.0, 3GPP Organizational Partners, Mar. 2011, 278 pages.

3GPP TS 25.331, "3rd Generation Partnership Project; Technical Specification Group Radio Access Network; Radio Resource Control (RRC); Protocol specification (Release 10)," V10.4.0, 3GPP Organizational Partners, Jun. 2011, 1879 pages.

3GPP TS 25.331, "3rd Generation Partnership Project; Technical Specification Group Radio Access Network; Radio Resource Control

(56) References Cited

OTHER PUBLICATIONS (RRC); Protocol specification (Release 10)," V10.1.0, 3GPP Organizational Partners, Sep. 2010, 1806 pages.
3GPP TS 25.413, "3rd Generation Partnership Project; Technical Specification Group Radio Access Network; UTRAN Iu interface Radio Access Network Application Part (RANAP) signalling (Release 10)," V10.0.0, 3GPP Organizational Partners, Dec. 2010, 409 pages.
3GPP TS 25.413, "3rd Generation Partnership Project; Technical Specification Group Radio Access Network; UTRAN Iu interface Radio Access Network Application Part (RANAP) signalling (Release 10)," V10.2.0, 3GPP Organizational Partners, Jun. 2011, 425 pages.
Author Unknown, "UTRA Cell_DCH mobility to UTRA and EUTRA CSG cells," 3GPP TSG-RAN WG2 Meeting #66 bis, R2-093836, Nokia Siemens Networks, Nokia Corporation, Los Angeles, USA, Jun. 4-Jul. 3, 2009, 7 pages.
Author Unknown, "Correction of CSFB," 3GPP TSG-RAN WG3 #67, R3-101145, Alcatel-Lucent, NTT DoCoMo, San Francisco, USA, Feb. 22-26, 2010, 3 pages.
Author Unknown, "On the alternative selection for Single Radio VCC from LTE," 3GPP TSG SA WG2 Architecture—S2#57, S2-071929, Nokia Siemens Networks, Nokia, Beijing, China, Apr. 23-27, 2007, 5 pages.
Author Unknown, "Details on the RRC Connection Release procedure," 3GPP TSG-RAN WG2 #61, Tdoc R2-080930, Ericsson, Sorrento, Italy, Feb. 11-15, 2008, 9 pages.
Written Opinion for International Patent Application PCT/SE2011/051076 mailed Aug. 16, 2013, 12 pages.
Notice of Allowance for U.S. Appl. No. 12/943,736 mailed Aug. 22, 2013, 18 pages.
Final Office Action for U.S. Appl. No. 12/943,685 mailed Nov. 8, 2013, 16 pages.
Advisory Action for U.S. Appl. No. 12/943,685 mailed Feb. 13, 2014, 7 pages.
Final Office Action for U.S. Appl. No. 13/180,195 mailed Mar. 6, 2014, 17 pages.
Non-final Office Action for U.S. Appl. No. 12/943,801 mailed Feb. 7, 2014, 15 pages.
Non-final Office Action for U.S. Appl. No. 12/943,612 mailed Apr. 10, 2014, 13 pages.
Non-Final Office Action for U.S. Appl. No. 12/943,685 mailed Sep. 12, 2014, 16 pages.
Non-final Office Action for U.S. Appl. No. 12/943,801 mailed Aug. 1, 2014, 14 pages.

\* cited by examiner

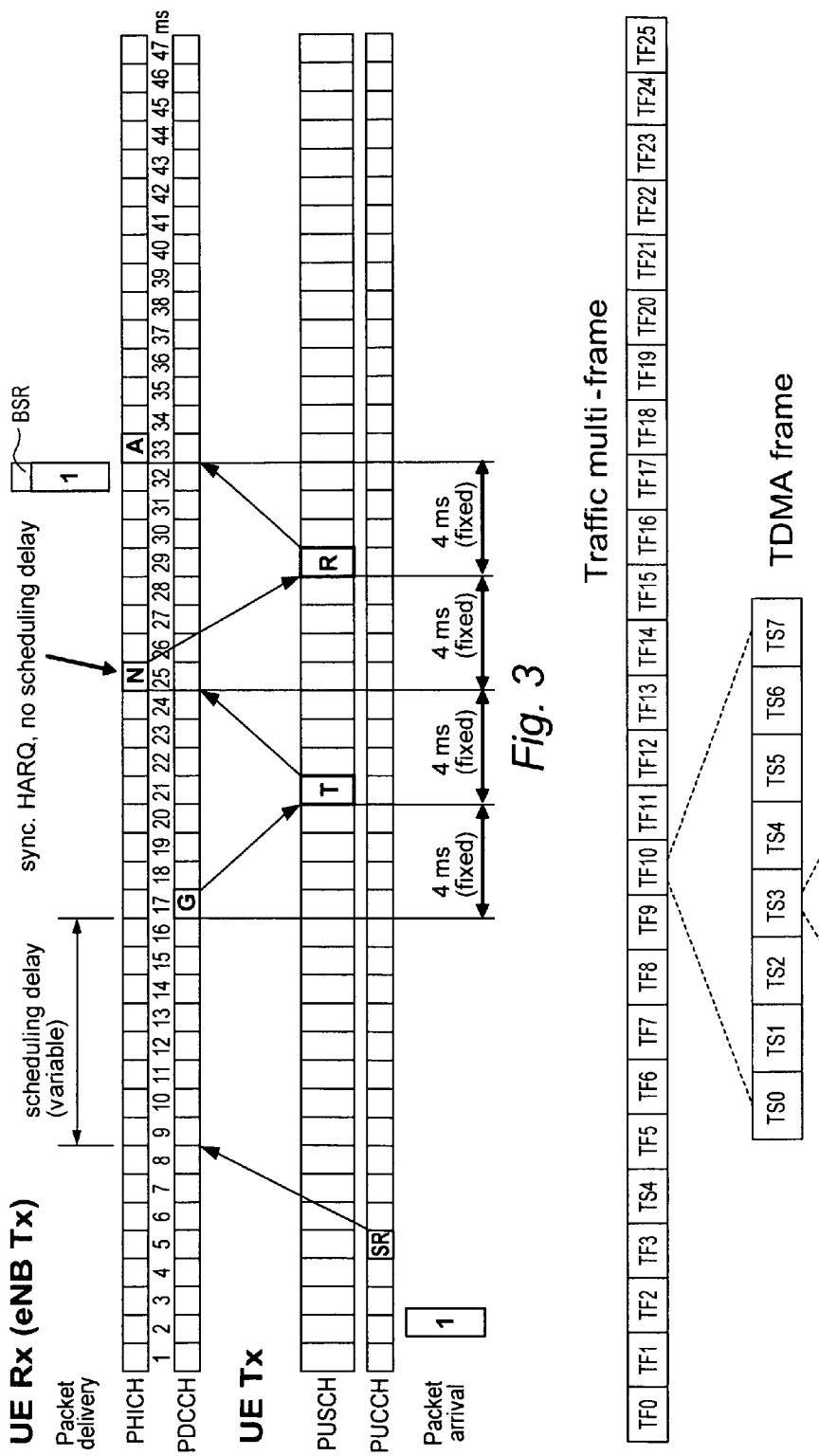

The offset delay

The guard delay

TDMA frames 0-25 in a Traffic multi-frame

Graphical representation of the UE LTE TX scheduling map (top) and the UE LTE RX scheduling map (bottom)

Full buffer LTE UL transmission

SCHEDULING FOR ACCESS DIVISION MULTIPLEXING

RELATED APPLICATIONS

This application is related to and claims the priority of the following United States Provisional Patent Applications, all of which are incorporated herein by reference in their entireties:

U.S. Provisional Patent Application 61/287,575 to Magnus Olsson et al., entitled "GSM and LTE Multiplexing Systems", filed on Dec. 17, 2009.

U.S. Provisional Patent Application 61/287,623 to Magnus Olsson et al., entitled "Measurement Report Relay in Access Division Multiplexing Systems", filed on Dec. 17, 2009.

U.S. Provisional Patent Application 61/287,438 to Magnus Olsson et al., entitled "WCDMA and LTE Multiplexing", filed on Dec. 17, 2009.

U.S. Provisional Patent Application 61/287,627 to Magnus Olsson et al., entitled "Telecommunications Multiplexing", filed on Dec. 17, 2009.

U.S. Provisional Patent Application 61/287,630 to Magnus Olsson et al., entitled "Access Division Multiplexing—Call Setup Performance Improvement", filed on Dec. 17, 2009.

U.S. Provisional Patent Application 61/287,954 to Magnus Olsson et al., entitled "Scheduled Optimized for GSM and LTD Multiplexing", filed on Dec. 17, 2009.

This application is related to the following United States patent applications, all of which are filed on same date herewith and incorporated herein by reference in their entireties:

U.S. patent application Ser. No.12/943,801 to Magnus Olsson et al., entitled "GSM and LTE Multiplexing".

U.S. patent application Ser. No. 12/943,770 to Magnus Olsson et al., entitled "Link Report Relay in Access Division Multiplexing Systems".

U.S. patent application Ser. No. 12/943,612 to Magnus Olsson et al., entitled "Keeping Packet Switched Session in LTE While Circuit Switched Registered in WCDMA".

U.S. patent application Ser. No. 12/943,685 to Magnus Olsson et al., entitled "Maintaining Packet Switched Session in LTE When Establishing GSM Circuit Switched Call".

U.S patent application Ser. No. 12/943,736 to Magnus Olsson et al., entitled "Call Setup For Access Division Multiplexing".

TECHNICAL FIELD

This technology pertains to wireless communications networks, and particularly to scheduling for access division multiplexing (ADM).

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Serving Gateways, or SGWs) rather than to radio network controller (RNC) nodes. In general, in LTE the functions of a radio network controller (RNC) node are distributed between the radio base stations nodes (eNodeBs in LTE) and SGWs. As such, the radio access network (RAN) of an LTE system has an essentially "flat" architecture comprising radio base station nodes without reporting to radio network controller (RNC) nodes.

Cellular Circuit-Switched (CS) telephony was introduced in the first generation of mobile networks. Since then CS telephony has become the largest service in the world with approximately 4 billion subscriptions sold. Even today, the main part of the mobile operator's revenue comes from the CS telephony service (including Short Message Services (SMS)), and the 2G GSM networks still dominate the world in terms of subscriptions. 3G subscriptions are increasing in volume, but that increase is less in part because of users with handheld mobile terminals migrating from 2G to 3G and more as a result of mobile broadband implemented via dongles or embedded chipsets in laptops.

The long-term evolution (LTE) project within 3GPP aims to further improve the 3G standard to, among other things, provide even better mobile broadband to the end-users (higher throughput, lower round-trip-times, etc.).

A common view in the telecommunication industry is that the future networks will be all-IP networks. Based on this assumption, the CS domain in was removed in the LTE work. As a result, the telephony service cannot be used by a 3GPP Release 8 compliant LTE terminal, unless one of the following four things is done:

(1) Implement CS fallback, (CSFB), so that an LTE terminal falls back to 2G GSM when telephony service is used.

(2) Implement 3GPP IP Multimedia Subsystem (IMS)/Multimedia Telephony (MMTel), which is a simulated CS telephony service provided over IP and IMS that inter-works with the Public Switched Telephone Network (PSTN)/Public Land Mobile Network (PLMN).

(3) Implement a tunneling solution with Unlicensed Mobile Access (UMA)/Generic Access Network (GAN) over LTE where the CS service is encapsulated into an IP tunnel.

(4) Implement a proprietary Voice over IP (VoIP) solution with PSTN/PLMN interworking.

All of these four possibilities have drawbacks. In deployed GSM networks that do not have Dual Transfer Mode (DTM) capabilities; CS and Packet Switched (PS) services cannot be used in parallel. Hence, all PS services running prior to a call to or from a terminal using Circuit Switched Fallback (CSFB) are put on hold or are terminated. If the GSM network has DTM, the PS performance will be greatly reduced (from 10's of Mbps to 10's to 100's of kbps). One drawback with the CS fallback approach is that when calling or being called and the terminal is falling back to GSM and the CS service from LTE. Circuit Switched Fallback (CSFB) also prolongs call set-up time.

The IMS/MMTel approach uses a completely new core/service layer that is IMS based. This provides new possibilities to enhance the service but also comes with the drawback of a financial hurdle for the operator to overcome. A new core network drives capital expenditures (CAPEX), and integration of that core network drives an initial operating expenditures (OPEX) increase. Further, the IMS/MMTel approach needs features implemented in the terminals and the legacy CS network in order to handle voice handover to/from the 2G/3G CS telephony service.

Using UMA/GAN over LTE is not a standardized solution so a drawback is that it is a proprietary solution which may make terminal availability a problem. It also adds additional functions to the core/service layer in both the network and terminal, e.g., a GAN controller in the network and GAN protocols in the UE terminal.

The proprietary VoIP approach, if operator controlled, comes with the same drawbacks as for the IMS/MMTel (new core/service layer) approach along with the difficulties associated with it being proprietary and handover to 2G/3G CS may not be supported.

There is yet a further solution for using a legacy CS telephony service with a wireless terminal such as a 3GPP release 8-compliant LTE terminal. In that further solution, also known as a type of Access Division Multiplexing (ADM), transmissions of GSM CS voice are interleaved in between LTE transmissions. See, e.g., PCT/SE2007/000358, which is incorporated herein by reference. In one example implementation of such an ADM solution a wireless terminal simultaneously communicates with two TDMA-based radio systems, e.g., the wireless terminal can maintain communications paths to both systems by means of alternating in time its communication between the two systems. The toggling between the two systems is on a time scale small enough to effectively yield a simultaneous communication between the two systems.

This further solution attempts to achieve a good PS connection in parallel with the telephony service when in LTE coverage but still reusing the legacy CS core and deployed GSM network for the telephony service to reduce costs but still maintain good coverage for the telephony service.

This further or ADM solution may be implemented in several ways. A first example implementation, illustrated in FIG. 1A, is a fully UE centric solution where no coordination is needed between the GSM CS core and a LTE PS core. A second example implementation, illustrated by FIG. 1B, is a network assisted solution which can either be based on circuit switched fallback (CSFB), or a solution that only reuses paging over LTE.

From a radio perspective, the solution can be realized in any of three different ways: As a first example radio realized embodiment illustrated in FIG. 2A, the LTE transmissions could be multiplexed with the GSM transmissions on a GSM TDMA frame level. This first example solution requires that the GSM CS telephony service only use the half rate codec.

When GSM is running at half rate, then every second GSM TDMA frame is not used by the user.

As a second example radio realized embodiment illustrated in FIG. 2B, the LTE transmissions could be multiplexed with the GSM transmissions on GSM burst level. GSM transmits speech using bursts, each with a duration of 0.577 ms. In speech operation, after having sent one burst, the Rx/Tx part sleeps for 7*0.577 ms until it wakes up again and do a new Rx/Tx process. In this second example this time gap could be used for LTE transmissions.

As a third example radio realized embodiment illustrated in FIG. 2C, any of above can be used for transmission but by using dual receiver for simultaneous reception of GSM and LTE in the downlink for simplified operation.

FIG. 3 shows how data is transmitted in time slots in Global System for Mobile communication (GSM). Each burst period in a time slot is approximately 0.577 msec. As further shown in FIG. 4, a TDMA frame includes 8 time slots and is 4.615 msec long. A traffic multi-frame includes 26 TDMA frames and is 120 msec long. In GSM full rate, 24 out of 26 TDMA frames are used for voice traffic transport: one is used for control (TDMA frame 12) and one is unused (TDMA frame 25).

PCT/SE2007/000029 and PCT/SE2007/000358 describe exchange of data between a single terminal and multiple networks, and discloses use of a scheduling map that is sent to at least one of the networks to inform which transmission time intervals that can be used for data transmission to/from this network. However such document(s) do(es) not address the specific problems of using a scheduling map in Long Term Evolution (LTE) developed for the interleaving of LTE transmissions in between Global System for Mobile communication (GSM) voice transmissions.

FIG. 4 illustrates aspects of Long Term Evolution (LTE) uplink (UL) scheduling. When a packet is to be sent, the UE transmits a scheduling request (SR). A minimum of 4 msec later (or longer due to a variable scheduling delay), the eNodeB transmits a grant (G). Then (4 ms [a fixed value] later) the data is transported. If the data is not received properly, a NACK (N) is sent 4 msec after the data transmission attempt. This triggers a retransmission (R) which again happens 4 ms later. In the example shown in FIG. 4, this transmission is successful and thus an ACK (A) is sent 4 ms later. Hence, in the LTE UL transmissions, there is a fixed timing between grants, transmissions, ACK/NACK, and retransmissions. When applying a scheduling map there is a problem of accommodating these events using the fixed timing scheme described above.

Thus developing a scheduling map can be problematic when interleaving GSM circuit switched (CS) voice and LTE transmissions. Problems encountered include how the scheduling map will be derived, determining the length of the scheduling map (e.g., how long the scheduling map should be), and what parameters should be used to derive the scheduling map.

SUMMARY

The technology disclosed herein basically concerns method and apparatus for generating and/or updating a scheduling map(s) employed in an access division multiplexing (ADM) environment for allocating resource utilization (e.g., use of transmission time intervals) to or between differing radio access technology networks, and particularly to a Long Term Evolution (LTE) network and a Global System for Mobile communication (GSM) network. In some example embodiments the scheduling map(s), apparatus, and methods hereof are implemented in a wireless terminal which participates in access division multiplexing between the differing radio access technologies. In other example embodiments the scheduling map(s), apparatus, and methods hereof are implemented in a network node (e.g., eNodeB) of one of the radio access technology networks, e.g., the Long Term Evolution (LTE) network.

In example embodiments wherein the scheduling map is generated by the wireless terminal, an example implementation of such wireless terminal comprises a communications interface, a communications handler, and a scheduling map generator. The communications interface is configured to facilitate, e.g., interleaved transmissions over the radio interface. The communications handler is configured to operate in accordance with the scheduling map for processing the interleaved transmissions. The scheduling map generator is configured to generate the scheduling map.

In example embodiments wherein the scheduling map is generated by a radio access network node, an example implementation of such node comprises a communications interface and a scheduling map generator. The communications interface is configured to facilitate the interleaved transmissions over the radio interface. The scheduling map generator is configured to generate the scheduling map.

Although herein often referenced merely in the singular as a "scheduling map", it will be appreciated that each of the example embodiments and modes described herein can encompass apparatus and method for multi-directional scheduling, e.g., method and apparatus for preparing both an uplink (UL) scheduling map and a downlink (DL) scheduling map. The uplink (UL) scheduling map is configured to prescribe time intervals in which the wireless terminal can send information in LTE transmission time intervals across the radio interface; the downlink (DL) scheduling map is configured to prescribe time intervals in which the wireless terminal can receive information in LTE transmission time intervals from the radio interface.

An example embodiment and mode of the technology disclosed herein concerns apparatus and method for preparing a scheduling map which has a length which is a multiple of sixty or one hundred twenty transmission time intervals of the Long Term Evolution (LTE) network, e.g., 60/120-multiple TTI length scheduling map. In some example embodiments the 60/120-multiple TTI length scheduling map is generated by a wireless terminal. In other embodiments the 60/120-multiple TTI length scheduling map is generated by a node of a radio access network handover control node.

An example embodiment and mode of the technology disclosed herein concerns apparatus and method for preparing a scheduling map using two or more of variables or parameters (e.g., a multi-input dependent scheduling map). The variables or parameters used to generate the multi-input dependent scheduling map can include two or more of the following: (1) an offset delay between transmission time intervals of the Long Term Evolution (LTE) network and a start of a GSM traffic multi-frame; (2) a guard delay required by the wireless terminal hardware/software to move from a GSM transmit operation to a LTE receive or from a GSM receive operation to a LTE transmit operation; (3) a time slot number used for GSM voice transmissions both in an uplink (UL) communication across the radio interface from the wireless terminal and a downlink (DL) communication across the radio interface toward the wireless terminal; (4) a GSM time delay difference between uplink (UL) and downlink (DL) timeslots; (5) an indication whether a half rate or a full rate codec is used; (6) an indication whether a dual receiver structure or a single receiver structure is used; and (7) an indication of what type time division method is to be implemented (e.g., either a first type of time division method of mapping LTE transmissions between time slots or a second type of time division method of mapping LTE transmissions between TDMA frames). In some example embodiments the multi-input dependent scheduling map is generated by a wireless terminal. In other embodiments the multi-input dependent scheduling map is generated by a node of a radio access network handover control node.

In accordance with an example embodiment and mode, the technology disclosed herein further concerns an adaptively regenerable scheduling map, e.g., method and apparatus for regenerating at least a portion of the scheduling map when there is change of the one or more input variables or parameters. In some example embodiments the adaptively regenerable scheduling map is generated by a wireless terminal. In other embodiments the adaptively regenerable scheduling map is generated by a node of a radio access network handover control node.

An example embodiment and mode of the technology disclosed herein concerns apparatus and method for preparing and/or using a scheduling map for determining a LTE transmission time interval in which the wireless terminal is to send a scheduling request on an uplink (UL) over the radio interface to the LTE network. In an example implementation the method and apparatus are arranged whereby the wireless terminal can use the scheduling map to determine when a LTE uplink (UL) data transmission can occur depending on a timing of a grant from the LTE network. In an example implementation the method and apparatus are arranged whereby the scheduling map is used to determine when an ACK or NACK can be received from the LTE network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2B showing an embodiment comprising a single receiver/transmitter with multiplexing on a burst period level; and FIG. 2C showing an embodiment comprising a dual receiver/single transmitter.

FIG. 3 is a diagrammatic view of Long Term Evolution (LTE) uplink (UL) scheduling.

FIG. 4 is a diagrammatic view of transmission in time slots in Global System for Mobile communication (GSM).

DETAILED DESCRIPTION

Figure 1A:
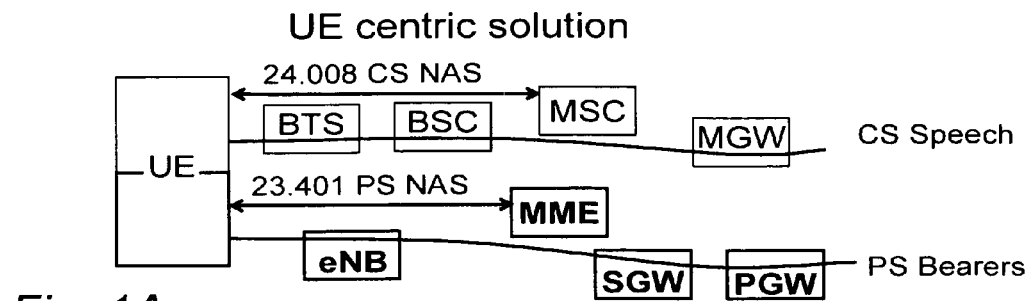
FIG. 1A is a diagrammatic view illustrating a fully UE centric solution ADM solution where no coordination is needed between a Global System for Mobile Communication (GSM) circuit switched (CS) core and a Long Term Evolution (LTE) packet switched (PS) core.
Figure 1B:
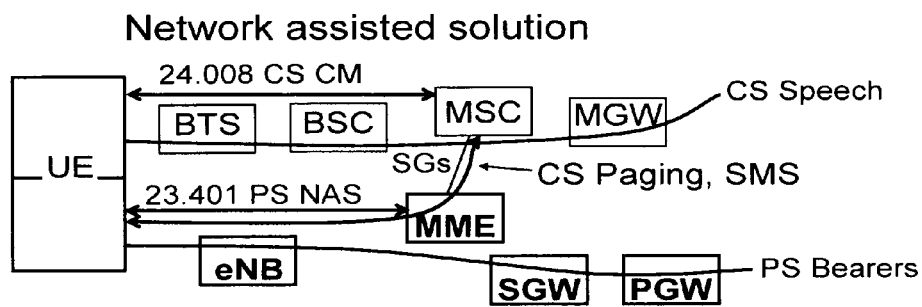
FIG. 1B is a diagrammatic view illustrating a network assisted access division multiplexing (ADM) solution which can either be based on circuit switched (CS) fallback (CSFB), or a solution that only reuses paging over Long Term Evolution (LTE).
Figure 2A:
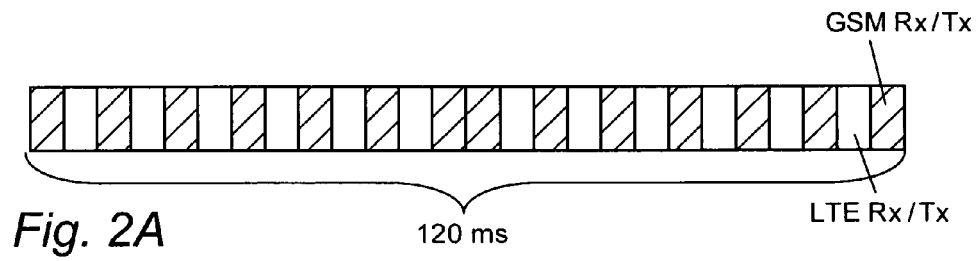
FIG. 2A, FIG. 2B, and FIG. 2C are differing example radio-realized embodiments illustrated of access division multiplexing (ADM) solutions, with FIG. 2A showing an embodiment comprising a single receiver/transmitter with GSM at half rate and multiplexing on a TDMA frame level.
Figure 2B:
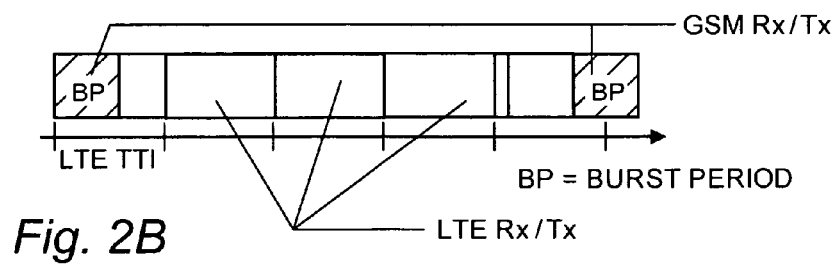
Figure 2C:
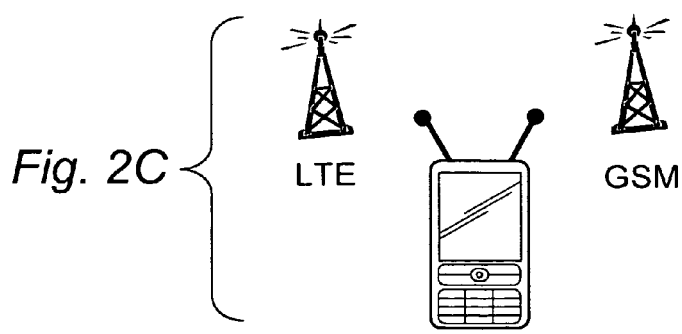

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 5:
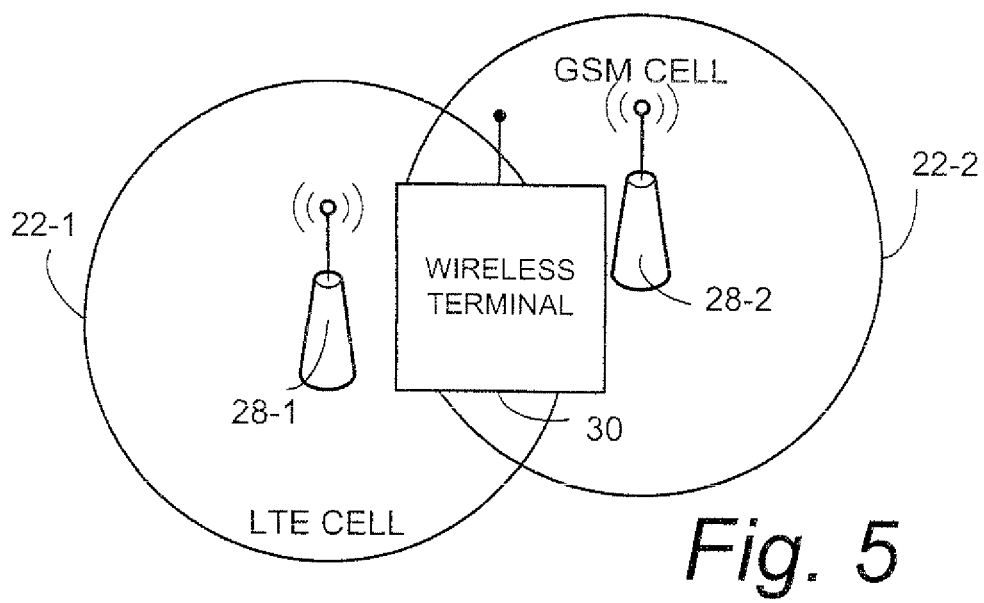
FIG. 5 is a diagrammatic view depicting a wireless terminal participating in access division multiplexing with a cell of a Long Term Evolution (LTE) network and a cell of a 2G (e.g., GSM) network.

FIG. 5 shows a communications system comprising at least a cell of GSM/GSM Edge Radio Access Network (GERAN) network 22-2 and a cell of Long Term Evolution (LTE) network 22-1. The GSM network 22-2 comprises a radio base station node 28-2 while the LTE network 22-1 comprises a base station or eNodeB 28-1. FIG. 5 further shows wireless terminal or "UE" 30 capable of participating in access division multiplexing (ADM). For example, wireless terminal 30 can participate in a packet switched (PS) session when in a cell of the Long Term Evolution (LTE) network 22-1 and can participate in circuit switched (CS) or even packet switched (PS) services provided by in GSM cell (e.g., a 2G cell) of GSM/GERAN network 22-2.

The technology disclosed herein basically concerns method and apparatus for generating and/or updating a scheduling map employed in an access division multiplexing (ADM) environment for allocating resource utilization (e.g., use of transmission time intervals) to or between differing radio access technology networks, and particularly to a Long Term Evolution (LTE) network such as network 22-1 and another network such as a GSM network (represented by network 22-2). The scheduling map is employed by the nodes of the networks and by the wireless terminal for determining when a transmission is to occur between a first radio access technology network (e.g., LTE) and the wireless terminal.

Various network nodes and the wireless terminal have versions (preferably essentially identical) of the scheduling map that permit the nodes and entities to communicate in coordinated, essentially un-obstructed fashion. In some example embodiments the scheduling map and methods hereof are implementation in wireless terminal 30, in other example embodiments the map and methods hereof are implemented in a node 28 (e.g., base station node) of one of the radio access technology networks.

Although herein often referenced merely in the singular as a "scheduling map", it will be appreciated that each of the example embodiments and modes described herein can encompass apparatus and method for multi-directional scheduling, e.g., method and apparatus for preparing both an uplink (UL) scheduling map and a downlink (DL) scheduling map. The uplink (UL) scheduling map is configured to prescribe time intervals in which the wireless terminal can send information in LTE transmission time intervals across the radio interface; the downlink (DL) scheduling map is configured to prescribe time intervals in which the wireless terminal can receive information in LTE transmission time intervals from the radio interface. Thus, a mention of scheduling map in any embodiment is not limited to a single scheduling map for a single direction, but can generically encompass both a scheduling map for the uplink (UL) direction (from the wireless terminal to the network) and a scheduling map for the downlink (DL) direction (from the network to the wireless terminal).

Figure 6:
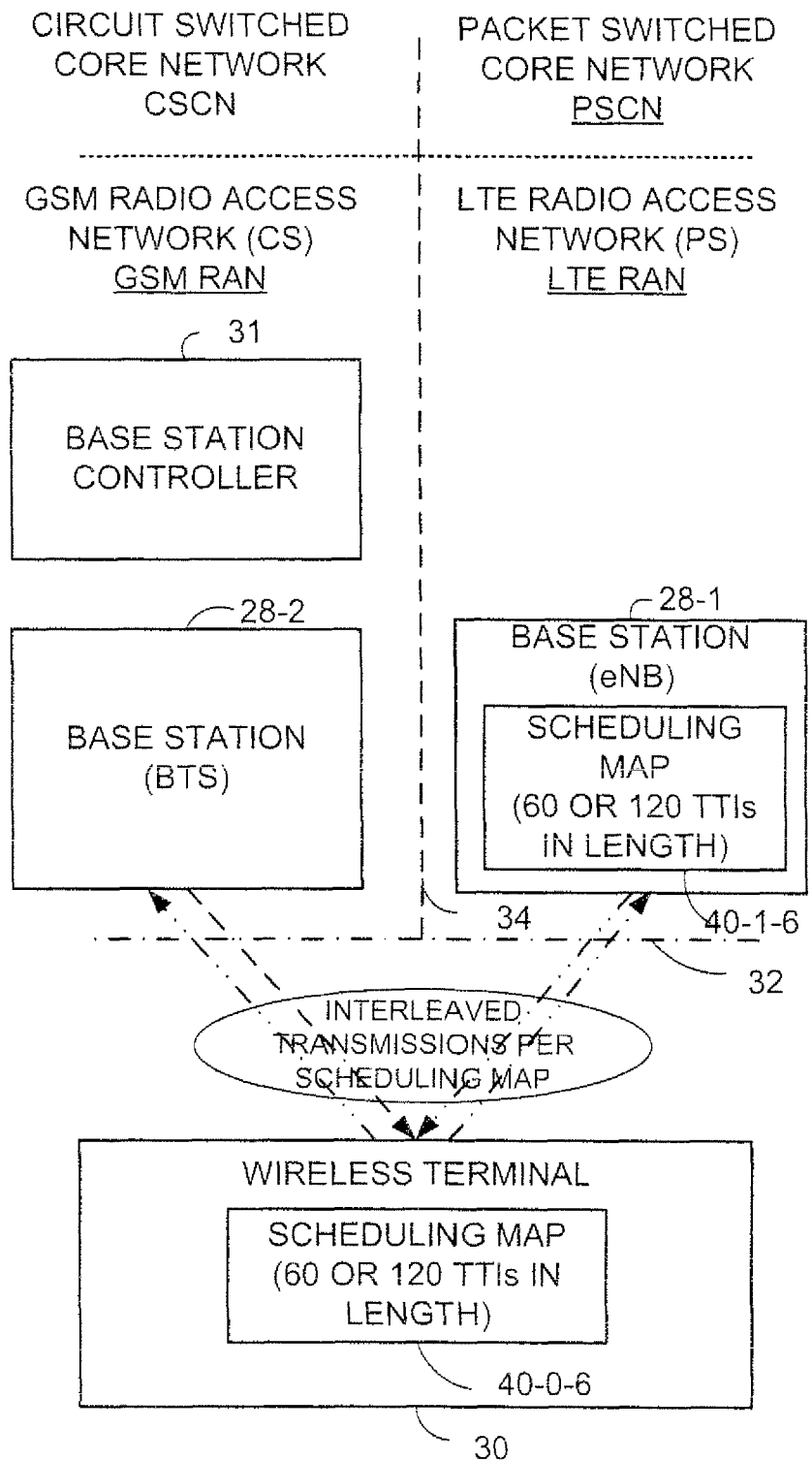
FIG. 6 is a schematic view of portions of a communication system comprising two radio access technology networks and in which a 60/120-multiple TTI length scheduling map is utilized for multiplexed transmissions between a wireless terminal and the two networks.

FIG. 6 shows portions of a communication system comprising two radio access technology networks (e.g., LTE network 22-1 and GSM network 22-2) and in which a 60/120-multiple TTI length scheduling map is utilized for multiplexed transmissions between a wireless terminal and the two networks. FIG. 6 shows not only the respective base stations 28-1 and 28-2 of the two radio access technology networks, but also base station controller node 31 for GSM network 22-2 as well as a radio or air interface 32 over which the wireless terminal 30 wirelessly communicates, communicating with the two networks 22-1 and 22-2, at least some of the time using access division multiplexing. FIG. 6 further shows (for sake of simplicity) a demarcation 34 between LTE network 22-1 and GSM network 22-2.

FIG. 6 also illustrates that eNodeB 28-1 and wireless terminal 30 are provided with a scheduling map. In particular, eNodeB 28-1 is provided with scheduling map 40-1-6 and wireless terminal 30 is provided with scheduling map 40-0-6. As mentioned above, the versions of the scheduling map 40 provided to eNodeB 28-1 and wireless terminal 30 are preferably essentially identical and facilitate communication between the wireless terminal (separately) and the two networks in coordinated, essentially un-obstructed fashion. Accordingly, for the different and respective embodiments described herein the version of the scheduling map distributed or otherwise resident at eNodeB 28-1 and the wireless terminal 30 are collectively and generically referred to as scheduling map 40.

When deriving scheduling maps for LTE transmissions in-between GSM voice transmissions, one factor to consider is the length of scheduling map 40. According to one aspect and example embodiment of the technology disclosed herein, the length of the scheduling map 40 is preferably an integral number of Long Term Evolution (LTE) transmission time intervals (TTIs). In addition, the scheduling map 40 also preferably has the length of an integral number of GSM frames or time slots. Otherwise, the scheduling pattern cannot be repeated without causing collisions between LTE transmissions and GSM transmissions in time. Thus, according to this aspect of the technology disclosed herein the scheduling pattern must be either a full traffic multi-frame long or half a traffic multi frame long. It can be half the traffic frame long since the traffic multi-frame is symmetric in that TDMA frame 0-11 and 13-24 are used for voice traffic. Hence, the scheduling map length is either 60 ms or 120 ms (or 60/120 LTE TTIs long). Therefore, for the example embodiment of FIG. 6 the scheduling map is referred to as a 60/120-multiple TTI length scheduling map.

The TTIs that can be used for LTE transport must be derived for both when the wireless terminal 30 can receive in the downlink (DL) and when the wireless terminal 30 can transmit in the uplink (UL). Therefore, although only one scheduling map is shown in eNodeB 28-1 and the wireless terminal 30 of FIG. 6, it is understood that two scheduling maps must be derived, i.e., one for the LTE uplink (UL) and another for the LTE downlink (DL), both such scheduling maps showing when LTE transmissions are possible relative to, e.g., GSM transmissions.

The 60/120-multiple TTI length scheduling map is used periodically until revoked or updated. By periodic use is meant that the scheduling map (or parameters needed to construct the scheduling map) need not be sent every 60 ms (120 ms), but that the last generated 60/120-multiple TTI length scheduling map can be used by the wireless terminal 30 and eNodeB 28-1 (e.g., the LTE system) until further notice, e.g., until a modification is required and/or occurs. Periodic use of the existing (e.g., already generated 60/120-multiple TTI length scheduling map is advantageous in saving processing time (obviating the need to store or check a new map every 60 ms) and perhaps even more importantly periodic use saves radio bandwidth. This is true since, in general, changes to the scheduling map are likely to be made on a time scale on the order of 10 s of seconds rather than every 60 ms.

Figure 6A:
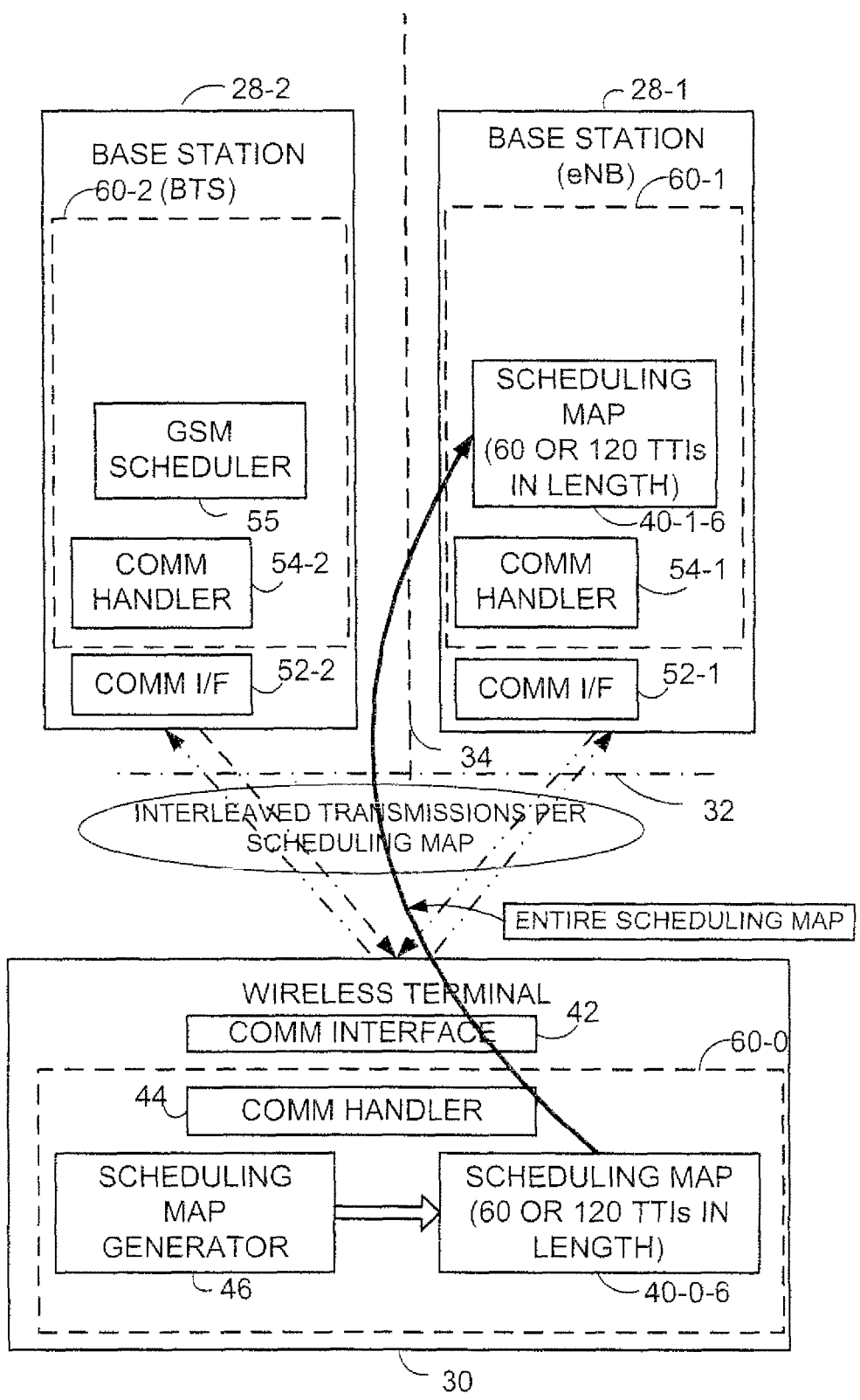
FIG. 6A is a schematic view of an implementation of the system of FIG. 6 wherein the scheduling map is generated by a wireless terminal and essentially the entire scheduling map is communicated from wireless terminal to at least one base station.
Figure 6B:
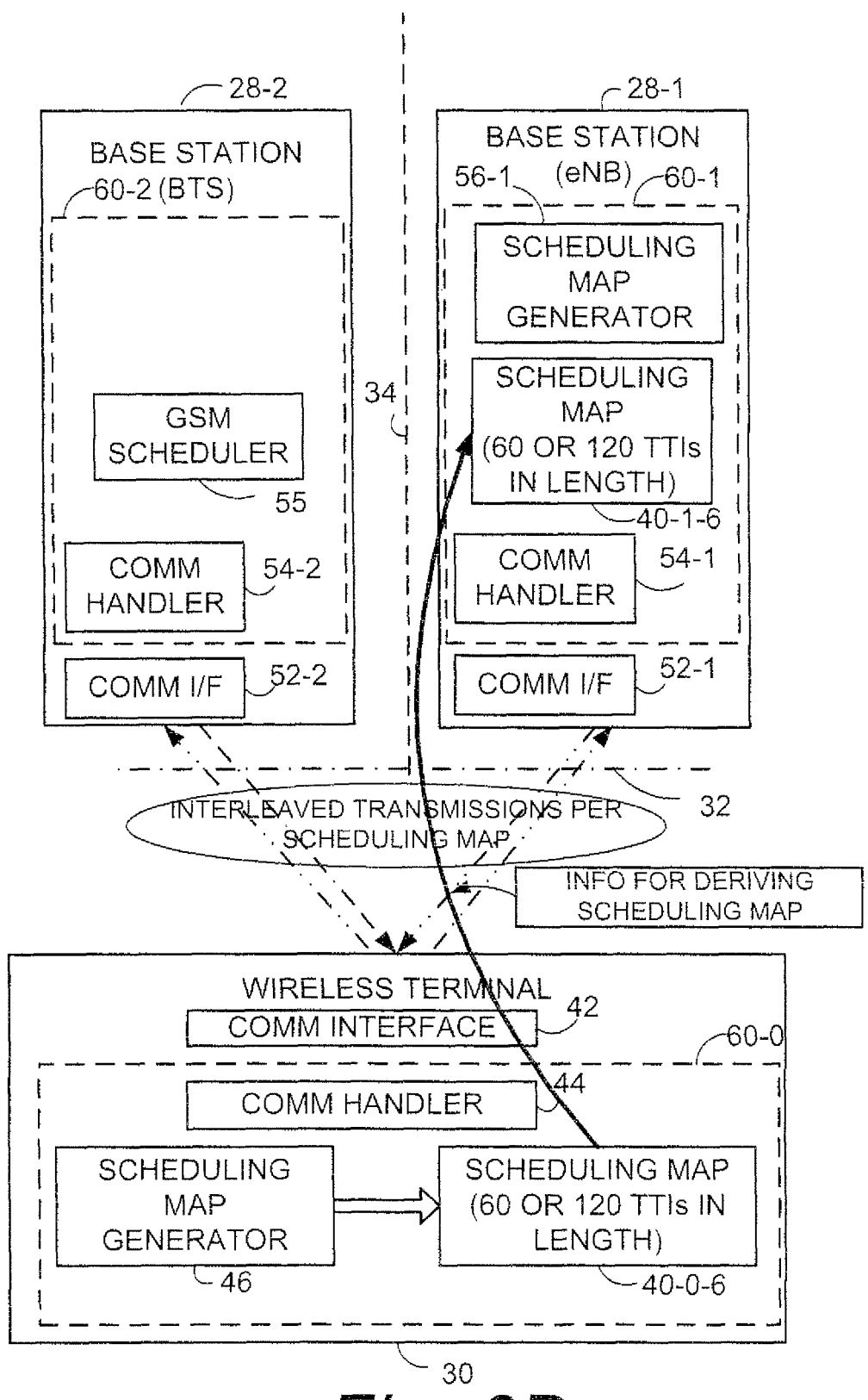
FIG. 6B is a schematic view of an implementation of the system of FIG. 6 wherein, rather than the wireless terminal communicating the entire scheduling map to a base station, the wireless terminal instead communicates certain parameters whereby the base station generates or derives its own versions of an entire scheduling map.

FIG. 6A shows in more detail selected example units of eNodeB 28-1 and wireless terminal 30 in an example embodiment and mode wherein the scheduling map is generated by wireless terminal 30 and essentially the entire scheduling map is communicated from wireless terminal 30 to eNodeB 28-1. FIG. 6B shows in more detail an example embodiment and mode wherein, rather than the wireless terminal communicating the entire scheduling map to eNodeB 28-1, the wireless terminal 30 instead communicates certain parameters whereby the eNodeB 28-1 can generate or derive its own version of an entire scheduling map.

Thus FIG. 6A and FIG. 6B show selected units or functionalities of eNodeB 28-1 and wireless terminal 30. For example, FIG. 6A and FIG. 6B illustrate that wireless terminal 30 comprises communications interface 42; communications handler 44, and scheduling map generator 46. The communications interface 42 is configured to facilitate, e.g., interleaved transmissions over the radio interface 32 as well as communication of the scheduling map (or, for the FIG. 6B embodiment, parameters from which the scheduling map can be derived) from wireless terminal 30 to base station 28-2 and eNodeB 28-1. The communications handler 44 is configured to operate in accordance with the scheduling map for processing the interleaved transmissions, e.g., both pre-processing of data prior to transmission and post-processing of data after transmission. The scheduling map generator 46 is configured to generate the scheduling map for the wireless terminal, e.g., scheduling map 40-0-6 in the FIG. 6 embodiment.

FIG. 6A and FIG. 6B further illustrate that eNodeB 28-1 comprises communications interface 52-1; communications handler 54-1; and a memory or processor or the like for accommodating scheduling map 40-1-6. Similarly GSM base station 28-2 also comprises communications interface 52-2 and communications handler 54-2, as well as a GSM scheduling controller 55 or the like keeps tracks of the slots or bursts which a GSM call is allowed to utilize. Communications interfaces 52 facilitate the interleaved transmissions over the radio interface, as well as communication of the scheduling map for the eNodeB 28-1 (or, for the FIG. 6B embodiment, parameters from which the scheduling map can be derived) from wireless terminal 30 to eNodeB 28-1. The communications handlers 54 operate in accordance with the scheduling map for processing the interleaved transmissions, e.g., both pre-processing of data prior to transmission and post-processing of data after transmission.

The example embodiment of FIG. 6B differs from the example embodiment of FIG. 6A in that eNodeB 28-1 further comprises a scheduling map generator 56-1. For the FIG. 6B example embodiment, the scheduling map generator 56-1 uses the parameters or variables sent by the wireless terminal 30 for deriving or generating the scheduling map 40-1-6 used by the eNodeB 28-1.

As mentioned above, although only one scheduling map is shown for the eNodeB 28-1 and the wireless terminal 30, both uplink (UL) and downlink (DL) scheduling maps are generated for eNodeB 28-1 and wireless terminal 30. Moreover, as depicted by FIG. 6A and FIG. 6B respectively, either the scheduling maps (FIG. 6A) or the parameters to derive the scheduling maps (FIG. 6B) are sent to the LTE network. The wireless terminal LTE TX (UL) scheduling map is also used internally in the wireless terminal to identify times when the wireless terminal can transmit. The LTE system needs the wireless terminal LTE RX (DL) scheduling map so it knows when the wireless terminal can receive LTE transmissions (control and data), and it needs the wireless terminal LTE TX (UL) scheduling map to understand for which TTIs a granted resource will be valid.

Broken line 60 depicts, in FIG. 6A and FIG. 6B as well as other figures, a platform by which functionalities and units illustrated within line 60 can be realized in example embodiments. For example, wireless terminal 30 can comprise platform 60-0; eNodeB 28-1 can comprise platform 60-1; and base station 28-2 can comprise platform 60-2. The terminology "platform" is a way of describing how the functional units of a wireless terminal or node can be implemented or realized by machine. One example platform is a computer implementation wherein one or more of the elements framed by line 60 are realized by one or more processors which execute coded instructions stored in memory (e.g., non-transitory signals) in order to perform the various acts described herein. In such a computer implementation the wireless terminal and/or nodes can comprise, in addition to a processor (s), a memory section (which in turn can comprise random access memory; read only memory; application program memory (which stores, e.g., coded instructions which can be executed by the processor to perform acts described herein); and any other memory such as cache memory, for example). Moreover, typically the wireless terminal and possibly the network nodes of each of the embodiments discussed herein can also comprise certain input/output units or functionalities, the representative input/output units being a keypad; an audio input device (e.g. microphone); a visual input device (e.g., camera); a visual output device (e.g., display); an audio output device (e.g., speaker), and possibly other types of input/output devices.

In the example of FIG. 6A and FIG. 6B and other drawings the platform depicted by line 60 has been illustrated as computer-implemented or computer-based platform. Another example platform for wireless terminal and/or the network nodes can be that of a hardware circuit, e.g., an application specific integrated circuit (ASIC) wherein circuit elements are structured and operated to perform the various acts described herein.

Before continuing with discussion of other example embodiments, it is emphasized that representative elements and functionalities of the wireless terminal and network nodes as already described, such as communications interfaces and communications handlers and platform implementation, can and typically do characterize other example embodiments herein described, although for sake of simplicity such representative elements and functionalities may not specifically be illustrated or discussed.

It was mentioned above, e.g., in conjunction with the embodiment of FIG. 6B, that the scheduling map can be derived using various parameters or variables. In another of its aspects the technology disclosed herein concerns apparatus and method for preparing a scheduling map using two or more of variables or parameters (e.g., a multi-input dependent scheduling map).

One example way to implement a multi-input dependent scheduling map is to use a control procedure that takes a set of variables and a set of static parameters into account. This control procedure may reside in the wireless terminal, and the scheduling maps are sent from the wireless terminal 30 to the LTE network 22-1. Alternatively, the control procedure may be located in both the wireless terminal 30 and LTE network 22-1, and the wireless terminal 30 sends all or a sub-set of the variables and static parameters to the LTE network 22-1 so that the LTE network 22-1 derives its own internal set of scheduling maps. In this alternative which uses input from the wireless terminal, the LTE system derives its scheduling map to be identical to the scheduling map already derived and stored inside the wireless terminal. This is possible since the set of input parameters as described herein together with the standards descriptions for Global System for Mobile Communication (GSM) in 3GPP uniquely define one and only one scheduling map.

Figure 7:
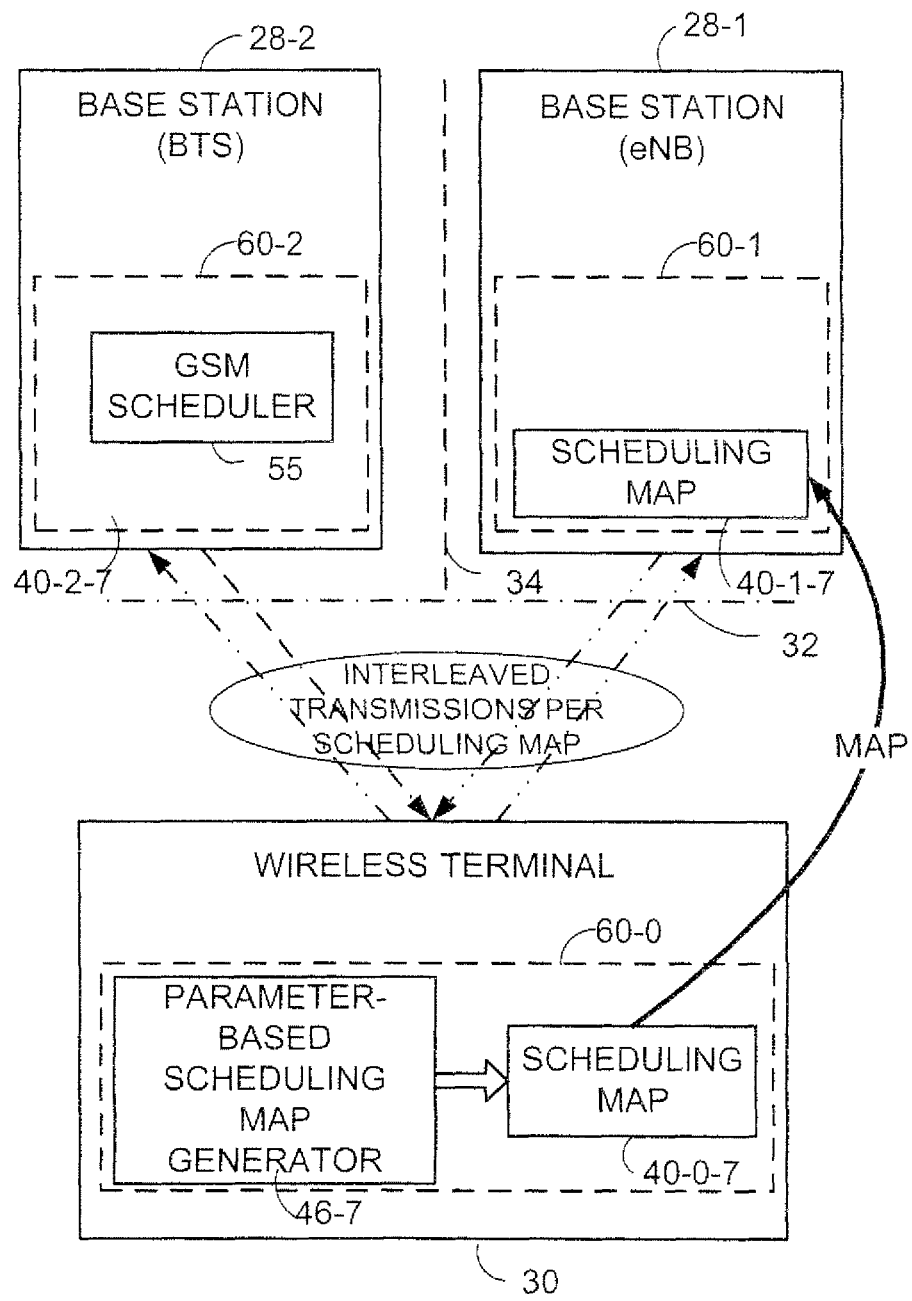
FIG. 7 is a schematic view of portions of a communication system comprising two radio access technology networks and in which a multi-input dependent scheduling map is utilized for multiplexed transmissions between a wireless terminal and the two networks.

FIG. 7 shows portions of a communication system comprising two radio access technology networks (e.g., LTE network 22-1 and GSM network 22-2) and in which a multi-input dependent scheduling map 40-x-7 is utilized for multiplexed transmissions between a wireless terminal and the two networks. As shown in FIG. 7 eNodeB 28-1 and wireless terminal 30 essentially resemble those of FIG. 6 and variations thereof, but include reference to multi-input dependent scheduling map 40-0-7 for wireless terminal 30 and multi-input dependent scheduling map 40-1-7 for eNodeB 28-1. Further FIG. 7 shows wireless terminal 30 as comprising parameter-based scheduling map generator 46-7. The parameter-based scheduling map generator 46-7 uses plural variables or parameters for generating the multi-input dependent scheduling map 40-0-7 which is utilized by wireless terminal 30 and which is transmitted by wireless terminal 30 to LTE network 22-1. Thus, in the example embodiment and mode of FIG. 7A the entire multi-input dependent scheduling map generated by parameter-based scheduling map generator 46-7 is not only used by wireless terminal 30 but is transmitted to eNodeB 28-1.

Figure 7A:
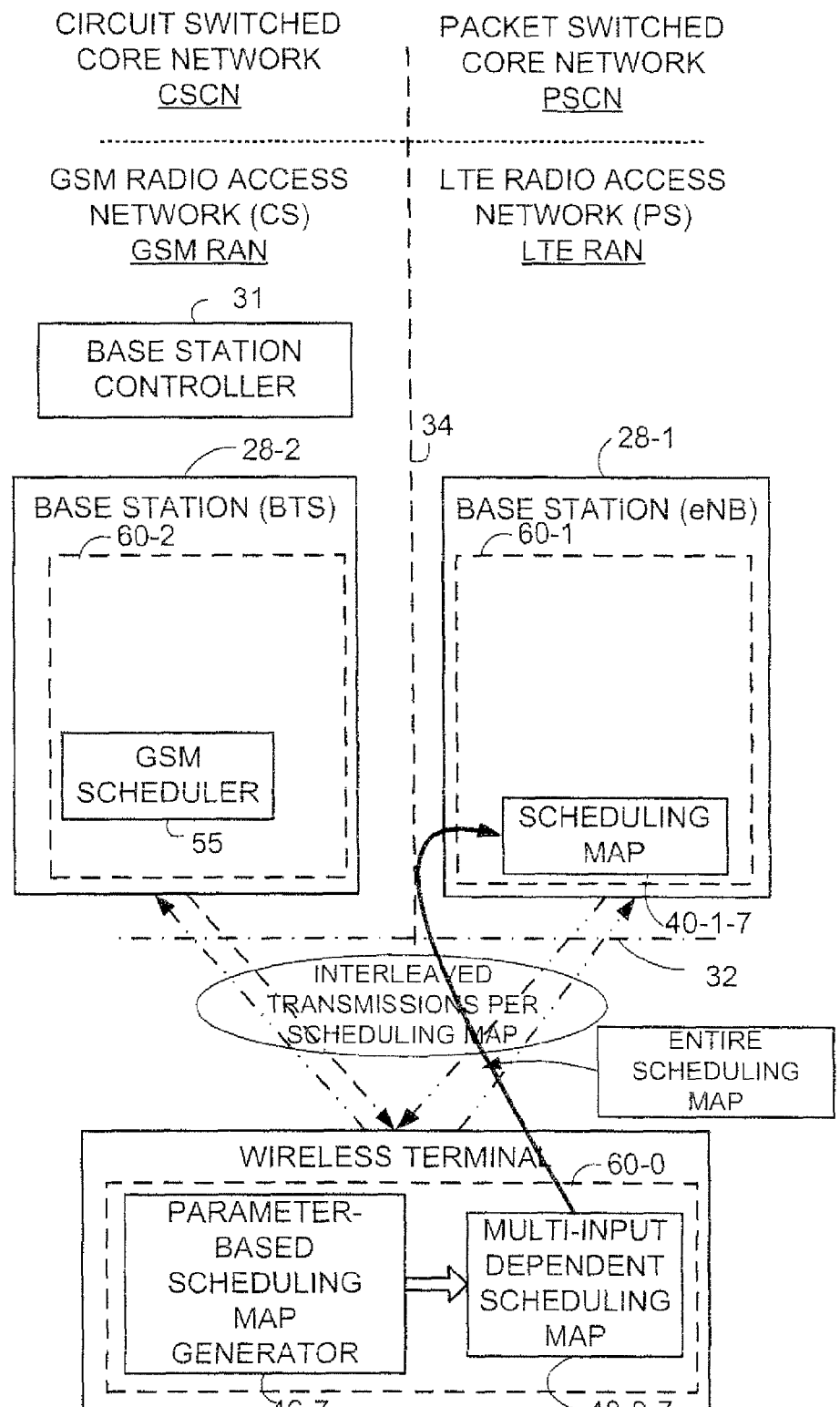
FIG. 7A is a schematic view of an implementation of the system of FIG. 7 wherein the multi-input dependent scheduling map is generated by a wireless terminal and essentially the entire multi-input dependent scheduling map communicated from wireless terminal to at least one base station.
Figure 7B:
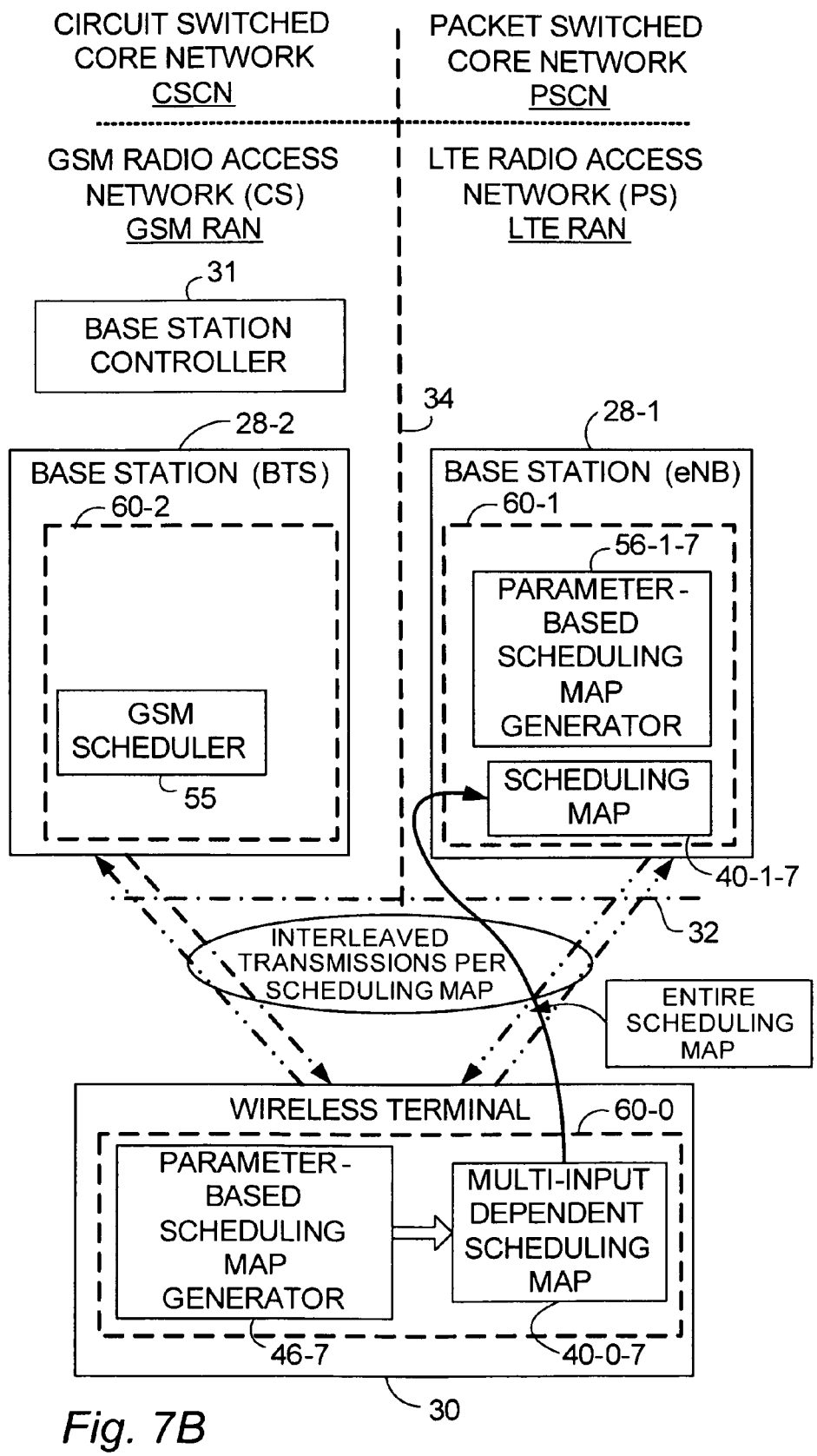
FIG. 7B is a schematic view of an implementation of the system of FIG. 7 wherein the multi-input dependent scheduling map is generated by a wireless terminal and wherein, rather than the wireless terminal communicating the entire multi-input dependent scheduling map to a base station, the wireless terminal instead communicates certain parameters whereby the base station generates or derives its own versions of the entire multi-input dependent scheduling map.

In the example embodiment and mode of FIG. 7B the wireless terminal 30 does not transmit its entire multi-input dependent scheduling map 40-0-7 to eNodeB 28-1, but rather the parameter-based scheduling map generator 46-7 receives plural inputs which are used to generate the multi-input dependent scheduling map. To this end FIG. 7B further shows eNodeB 28-1 as comprising parameter-based scheduling map generator 56-1-7. Some of the inputs used by parameter-based scheduling map generator 46-7 for building the multi-input dependent scheduling map can be received from wireless terminal (as indicated by an arrow in FIG. 7B). Alternatively some or all of the inputs can be received in signaling from the respective networks 22-1 and 22-2. The scheduling map generation inputs acquired by the parameter-based scheduling map generator 56-1-7 of eNodeB 28-1 are used to build the multi-input dependent scheduling map 40-1-7.

As in other embodiments described herein, reference to a multi-input dependent scheduling map, or to a scheduling map described by any other terminology, encompasses one or both of an uplink (UL) scheduling map and a downlink (DL) scheduling map. Thus, when one scheduling map is described, it is understood that both an uplink (UL) and downlink (DL) scheduling map may exist and that generation, utilization, and/or communication of a scheduling map encompasses generation utilization, and/or communication of both the uplink (UL) and downlink (DL) scheduling maps that are generically described by the mentioned scheduling map.

Figure 8:
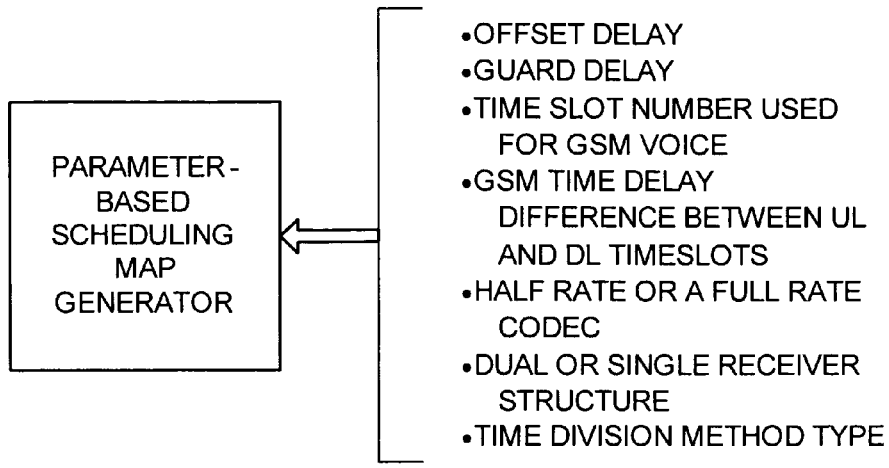
FIG. 8 is diagrammatic view illustrating receipt of plural inputs by a scheduling map generator of an example embodiment for building a multi-input dependent scheduling map.

FIG. 8 depicts the scheduling map generator 46-7 of FIG. 7A (and the scheduling map generators of the nodes such as scheduling map generator 56-1-7 of FIG. 7B) receiving plural inputs for generation of the multi-input dependent scheduling maps. The scheduling map generator 46-7 and scheduling map generator 56-1 can comprise a processor or circuit which executes coded, non-transitory logical instructions or an algorithm upon receipt of the plural input parameters or variables. As illustrated by FIG. 8, the variables or parameters used to generate the multi-input dependent scheduling map can include two or more of those listed in Table 1.

TABLE 1

Figure 9:
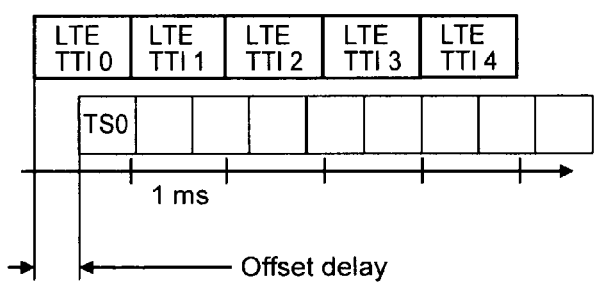
FIG. 9 is a diagrammatic view illustrating an offset delay between transmission time intervals of the Long Term Evolution (LTE) network and a start of a GSM traffic multi-frame.

INPUTS FOR GENERATION SCHEDULING MAP (1) an offset delay between transmission time intervals of the Long Term Evolution (LTE) network and a start of a GSM traffic multi-frame (as illustrated by FIG. 9).

TABLE 1-continued

Figure 10:
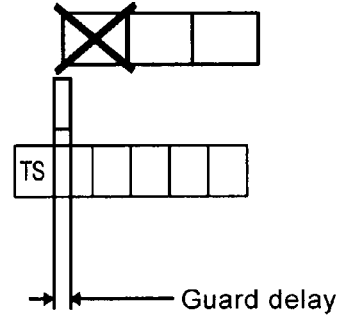
FIG. 10 is a diagrammatic view illustrating a guard delay required by the wireless terminal hardware/software to move from a GSM transmit operation to a LTE receive or from a GSM receive operation to a LTE transmit operation.

INPUTS FOR GENERATION SCHEDULING MAP (2) a guard delay required by the wireless terminal hardware/software to move from a GSM transmit operation to a LTE receive or from a GSM receive operation to a LTE transmit operation (as illustrated by FIG. 10).
(3) a time slot number used for GSM voice transmissions both in an uplink (UL) communication across the radio interface from the wireless terminal and a downlink (DL) communication across the radio interface toward the wireless terminal.
(4) a GSM time delay difference between uplink (UL) and downlink (DL) timeslots.
(5) an indication whether a half rate or a full rate codec is used.
(6) an indication whether a dual receiver structure or a single receiver structure is used.
(7) an indication of what type time division method is to be implemented (e.g., either a first type of time division method of mapping LTE transmissions between time slots or a second type of time division method of mapping LTE transmissions between TDMA frames).

Various inputs listed in Table 1 are briefly discussed below:

Offset delay (variable): The wireless terminal must measure the timing difference between a LTE transmission time interval (TTI) and the start of a traffic multi-frame for GSM. This timing difference is the offset value, which is illustrated in FIG. 9.

The guard delay (static) is the amount of delay the wireless terminal needs to switch between GSM and LTE RX/TX. FIG. 10 illustrates that the guard delay is the time the radio needs to switch from using a GSM time slot until it can use an LTE TTI.

The timeslot number (variable) is the time slot (TS0-TS7) used for the voice call. This data may change within the call, and thus, a new scheduling map must be derived and sent up due to handovers, etc.

Time delay between GSM UL/DL transmissions (static): The GSM UL and DL transmissions are separated by 3 time slots (~1.73 ms). This is preferably taken into account when deriving the UE LTE RX and UE LTE TX scheduling maps.

Figure 11:
FIG. 11 is a diagrammatic view illustrating a half rate codec transmission pattern of TDMA frame level.

Half rate codec or full rate codec (semi-static): if the operator uses a half rate codec, then every second TDMA frame is not used, and can thus be used for LTE transmissions. This setting can vary on time of day depending on operator policies. FIG. 11 shows a half rate codec transmission pattern of TDMA frame level (with the dark time slots depicting transmissions).

Dual or single receiver (static): in one example embodiment, the wireless terminal uses a dual receiver structure (i.e., can receive on GSM and LTE in parallel). In that case, the wireless terminal LTE RX scheduling map may allow the use of all (or almost) all LTE TTIs for reception of data or control messages in the wireless terminal. In case of a dual receiver, an assumption can be made that only one transmitter is used and that the wireless terminal time multiplex between LTE and GSM transmissions uses this one transmitter unit.

Time Division method, time slot level, or TDMA level (static): time division method where either the receive and transmit LTE data can be fit in-between timeslots (~4.04 msec in between time slots can be used). If the guard delay is quite high, perhaps a practical method is to run half-rate codec and do LTE receptions and transmissions in the empty TDMA frames instead.

Figure 12:
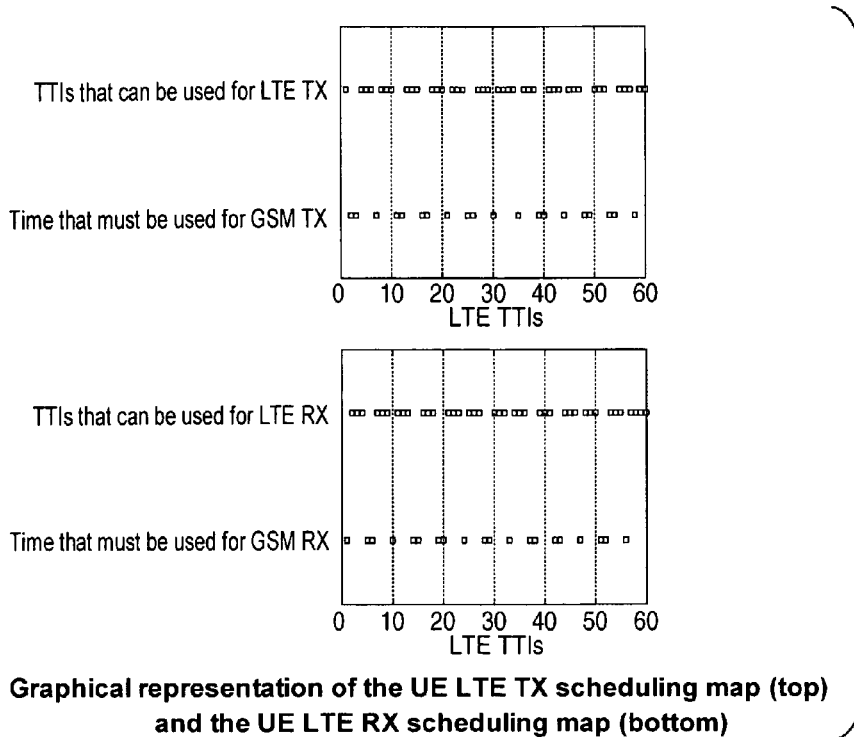
FIG. 12 is a graphical view of wireless terminal LTE RX and wireless terminal LTE TX scheduling maps indicating which LTE TTIs that can be used for LTE transmission or reception.

As mentioned above, FIG. 8 shows a graphical representation of a control procedure which uses multi-inputs to derive the scheduling maps. FIG. 12 shows a graphical representation of the wireless terminal LTE RX and wireless terminal LTE TX scheduling maps indicating which LTE TTIs that can be used for LTE transmission or reception.

The wireless terminal LTE TX and wireless terminal LTE RX scheduling maps or the input parameters to create the scheduling maps are sent to the LTE network in conjunction with the GSM call set-up. After the GSM call has ended, the wireless terminal indicates to the LTE system that the wireless terminal LTE TX and wireless terminal LTE RX scheduling maps are no longer valid for use for LTE transmission.

As mentioned above, the scheduling map (e.g., 60/120-multiple TTI length scheduling map) is used periodically until revoked or updated. However, if the input parameters change, e.g., as a result of the control procedure generating the wireless terminal LTE TX and/or wireless terminal LTE RX scheduling maps, then the wireless terminal LTE TX and/or wireless terminal LTE RX scheduling maps are recalculated. Thus, in accordance with an example embodiment and mode, the technology disclosed herein further concerns an adaptively regenerable scheduling map, e.g., method and apparatus for regenerating at least a portion of the scheduling map when there is change of the one or more input variables or parameters.

Figure 13:
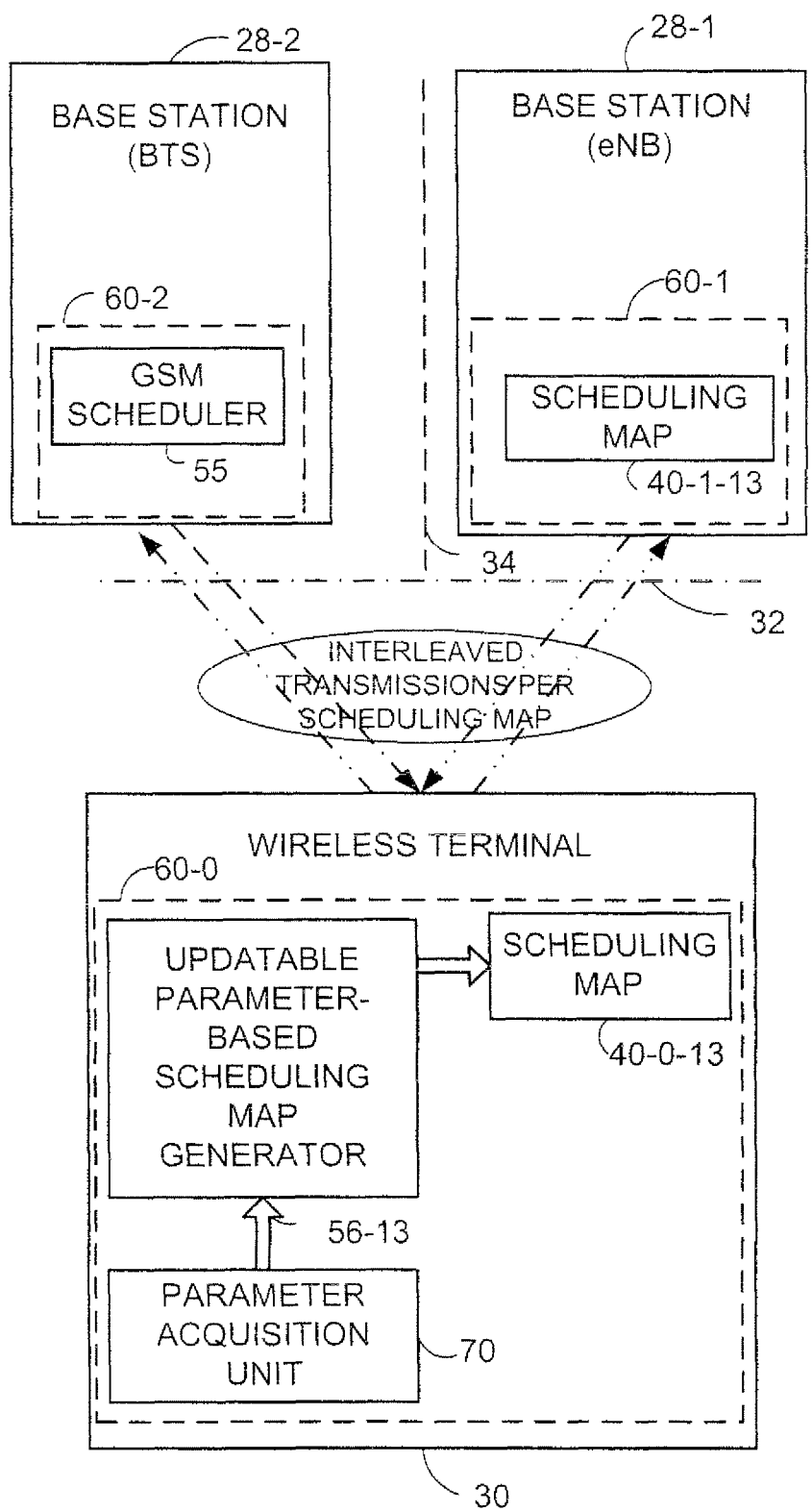
FIG. 13 is a schematic view of portions of a communication system comprising two radio access technology networks and in which an adaptively regenerable scheduling map is utilized for multiplexed transmissions between a wireless terminal and the two networks.

FIG. 13 shows portions of a communication system comprising two radio access technology networks (e.g., LTE network 22-1 and GSM network 22-2) and in which an adaptively regenerable scheduling map 40-x-13 is utilized for multiplexed transmissions between a wireless terminal and the two networks. As shown in FIG. 13 the base station 28-2, eNodeB 28-1, and wireless terminal 30 essentially resemble those of FIG. 6 and variations thereof, but include reference to adaptively regenerable scheduling map 40-0-7 for wireless terminal 30 and adaptively regenerable scheduling map 40-1-7 for eNodeB 28-1. Further FIG. 13 shows wireless terminal 30 as comprising adaptively regenerable scheduling map generator 46-13 and parameter acquisition unit 70. The parameter acquisition unit 70 detects or receives signals regarding changes in any of the input variables or parameters used to generate the scheduling map. Any changed input variable or parameter values as detected or discerned by parameter acquisition unit 70 are applied to scheduling map generator 56-13, which then regenerates or recalculates the adaptively regenerable scheduling map.

Figure 13A:
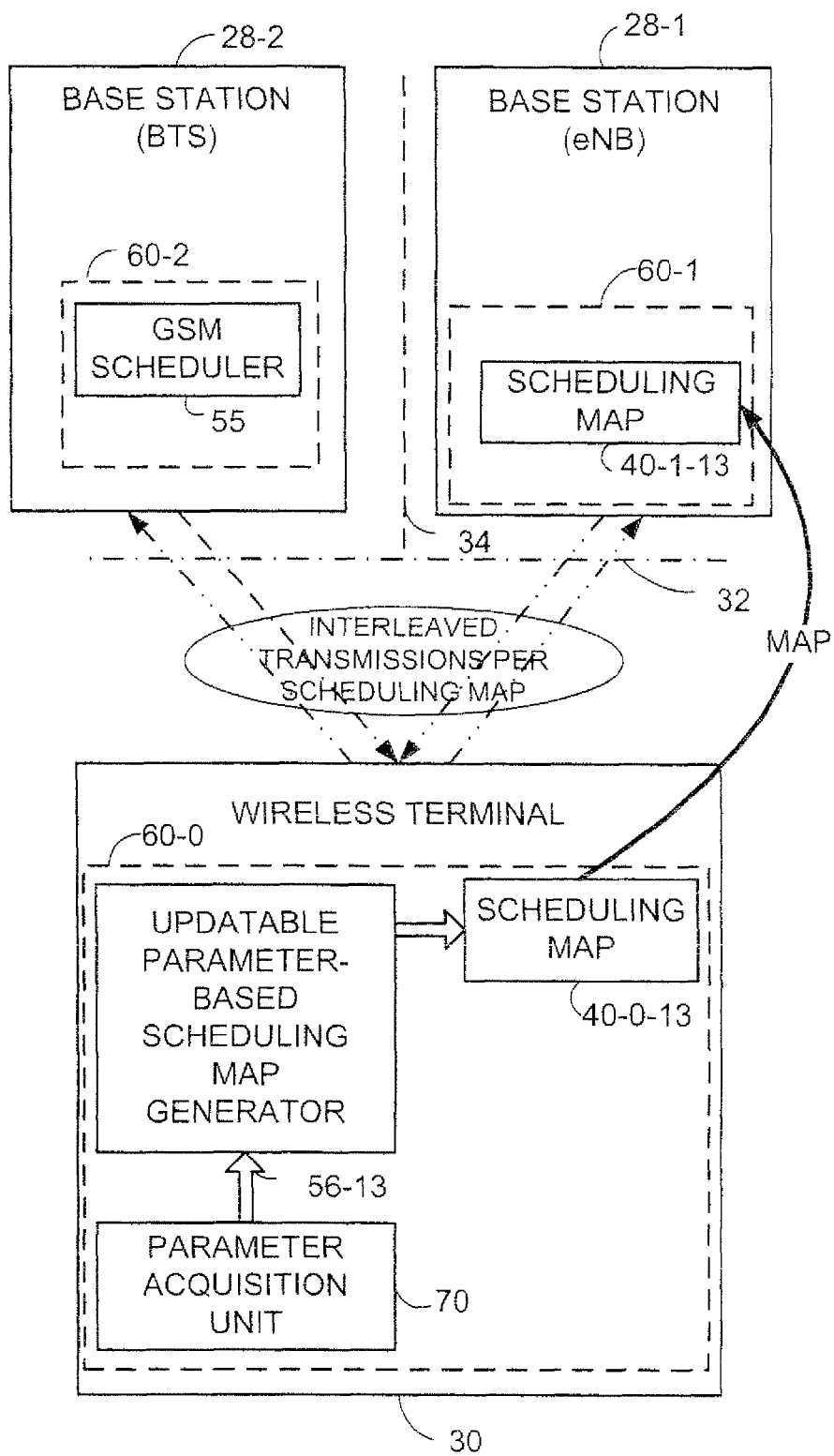
FIG. 13A is a schematic view of an implementation of the system of FIG. 13 wherein the adaptively regenerable scheduling map is generated by a wireless terminal and essentially the entire adaptively regenerable scheduling map is communicated from wireless terminal to at least one base station.
Figure 13B:
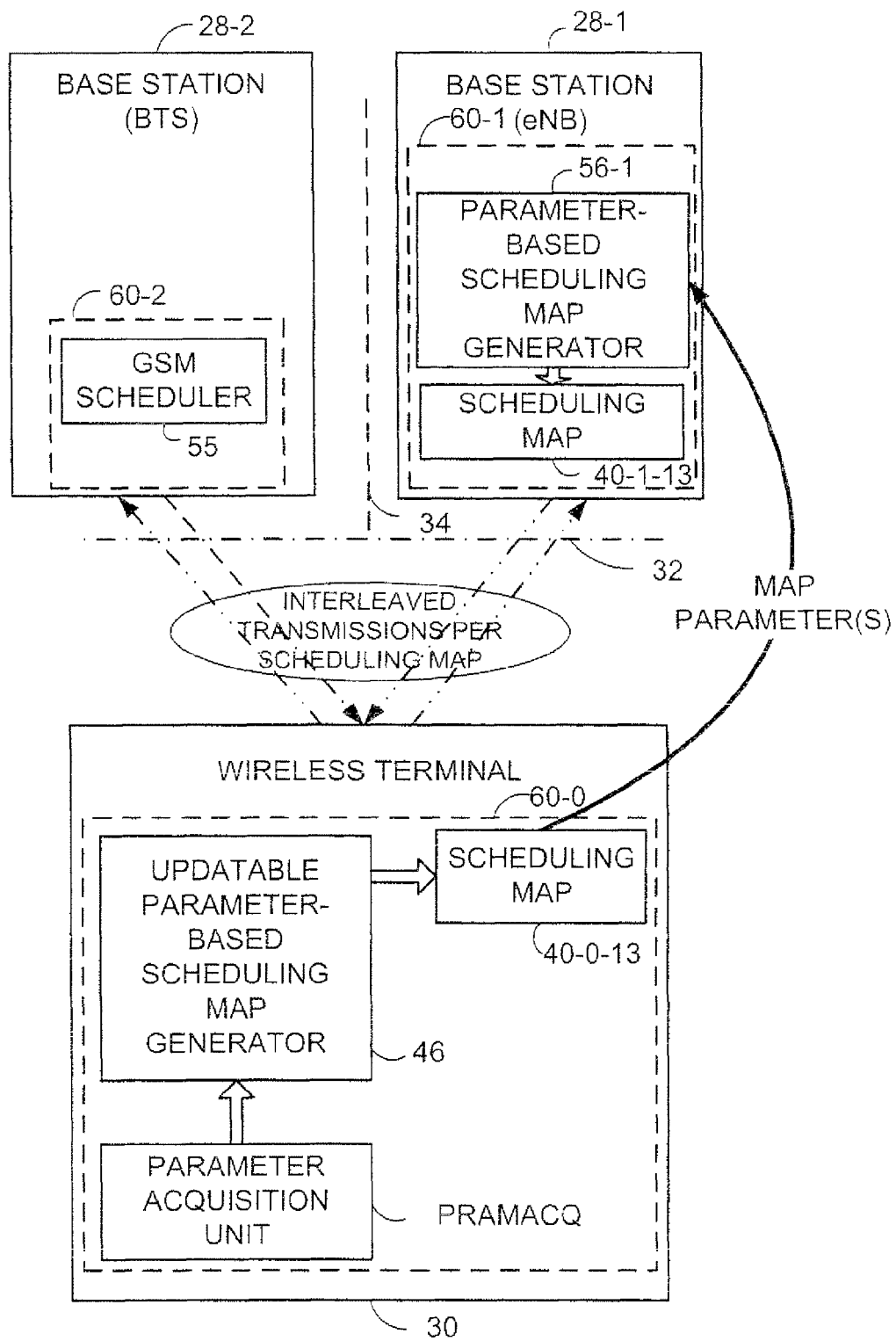
FIG. 13B is a schematic view of an implementation of the system of FIG. 13 wherein the adaptively regenerable scheduling map is generated by a wireless terminal and wherein an eNodeB uses updated parameters to update its own version of the entire adaptively regenerable scheduling map.

FIG. 13A shows an implementation of the system of FIG. 13 wherein the adaptively regenerable scheduling map is generated by a wireless terminal and essentially the entire adaptively regenerable scheduling map is communicated from wireless terminal to the eNodeB 28-1. FIG. 13B shows a differing implementation of the system of FIG. 13 wherein the adaptively regenerable scheduling map is generated by a wireless terminal and wherein eNodeB 28-1 uses updated parameters to update its own version of the entire adaptively regenerable scheduling map.

Thus, as understood with reference to the embodiment and mode of FIG. 13 and variations/implementations thereof, adaptively regenerable scheduling maps may be recalculated in the wireless terminal and sent to the LTE network (as in FIG. 13A), or the input parameters to create the scheduling maps are sent to the LTE network that recalculates its scheduling maps (as in FIG. 13B). One event when this may happen is handover when the time slot used for GSM voice transmissions could be changed. Another event that could trigger updates of the input parameters and hence the scheduling map is a moving wireless terminal that distances itself from the GSM radio base stations so that the offset delay changes due to changed timing advance.

Figure 14:
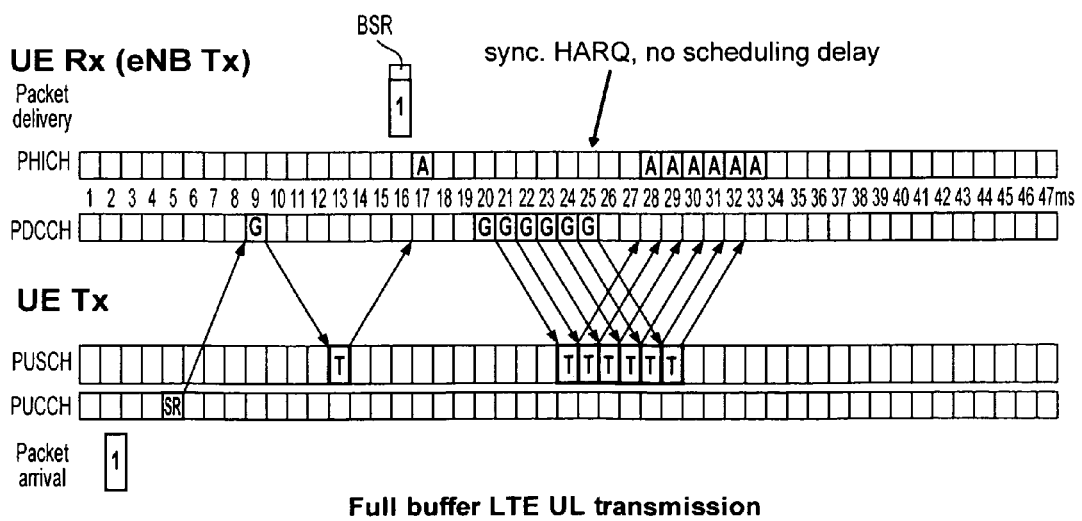
FIG. 14 is a diagrammatic view of LTE uplink (UL) scheduling.

An example scenario of LTE uplink (UL) scheduling is illustrated in FIG. 14. If there is a packet to send, the wireless terminal sends a scheduling request (SR). A minimum of 4 ms later (or longer due to a variable scheduling delay) the eNodeB transmits a grant (G) giving the wireless terminal the right to send a packet of a certain size in the transmission time interval (TTI) that occurs exactly 4 ms (fixed value) later. If the data is not received properly at the eNodeB, a NACK (N) is sent 4 msec after the data transmission attempt. This triggers a retransmission (R) 4 msec later. In the example above, this transmission is successful and thus an ACK (A) is sent 4 ms later.

When using a scheduling map this fixed timing is changed because, e.g., 4 msec after an LTE transmission, the wireless terminal may be tuned on GSM for receiving or sending GSM voice data. In that case, and if the wireless terminal is a single receiver wireless terminal, the ACK/NACK for this LTE transmission cannot be received. And in that case the wireless terminal must assume that the LTE transmission was not successful and will retransmit the LTE data.

Therefore, in accordance with an aspect of the technology disclosed herein the LTE timing is changed. Both the wireless terminal and eNodeB use the wireless terminal LTE RX and wireless terminal LTE TX scheduling maps. In using the scheduling maps the wireless terminal and the eNodeB exclude the TTIs that the wireless terminal is tuned into GSM transmissions/receptions and use the fixed timing of 4 TTIs between grant, transmission, ACK/NACK, and retransmissions. An example of this procedure is now described in more detail with reference to the acts of FIG. 15.

First, as act 15-1, a wireless terminal which participates in access division multiplexing (ADM) (e.g., GSM and LTE multiplexing) sends a scheduling request (SR) in a time where LTE transmissions are allowed according to the wireless terminal LTE TX scheduling map. Second, as act 15-2, the network uses the wireless terminal LTE RX scheduling map as one input to decide a suitable time for sending a grant to the wireless terminal. This grant occurs at least 4 ms later than the scheduling request (SR). Third, the wireless terminal receives the grant and, as act 15-3, uses the LTE TX scheduling map to determine when to send the LTE data. If there is a LTE TTI to be used for wireless terminal's transmission of LTE data in 4 ms according to the sent wireless terminal LTE TX scheduling map, then the LTE data is sent in that TTI. Otherwise, the next LTE TTI can be used for wireless terminal transmission of LTE data in the wireless terminal LTE TX scheduling map. Since both the wireless terminal and the eNodeB have this wireless terminal LTE TX scheduling map, both know which TTI will be used for the LTE transmission. Fourth, as act 15-4, the network sends the ACK/NACK for the LTE UL transmission in either 4 msec (if that corresponds to a possible LTE reception according to the wireless terminal LTE RX scheduling map) or the next possible LTE TTI that the wireless terminal can receive according to the sent wireless terminal LTE RX scheduling map. Fifth, as act 15-5 the wireless terminal understands that an ACK/NACK for a UL transmission will be received in 4 msec or the next LTE TTI that the wireless terminal can receive LTE data and thereafter control is according to the wireless terminal LTE RX scheduling map.

The eNodeB must understand that there may be more TTIs in the wireless terminal LTE RX scheduling map than in the wireless terminal LTE TX scheduling map (or vice versa). One example may be that for a dual receiver approach, there will be many more possible TTIs for LTE reception than for LTE transmission.

Figure 15:
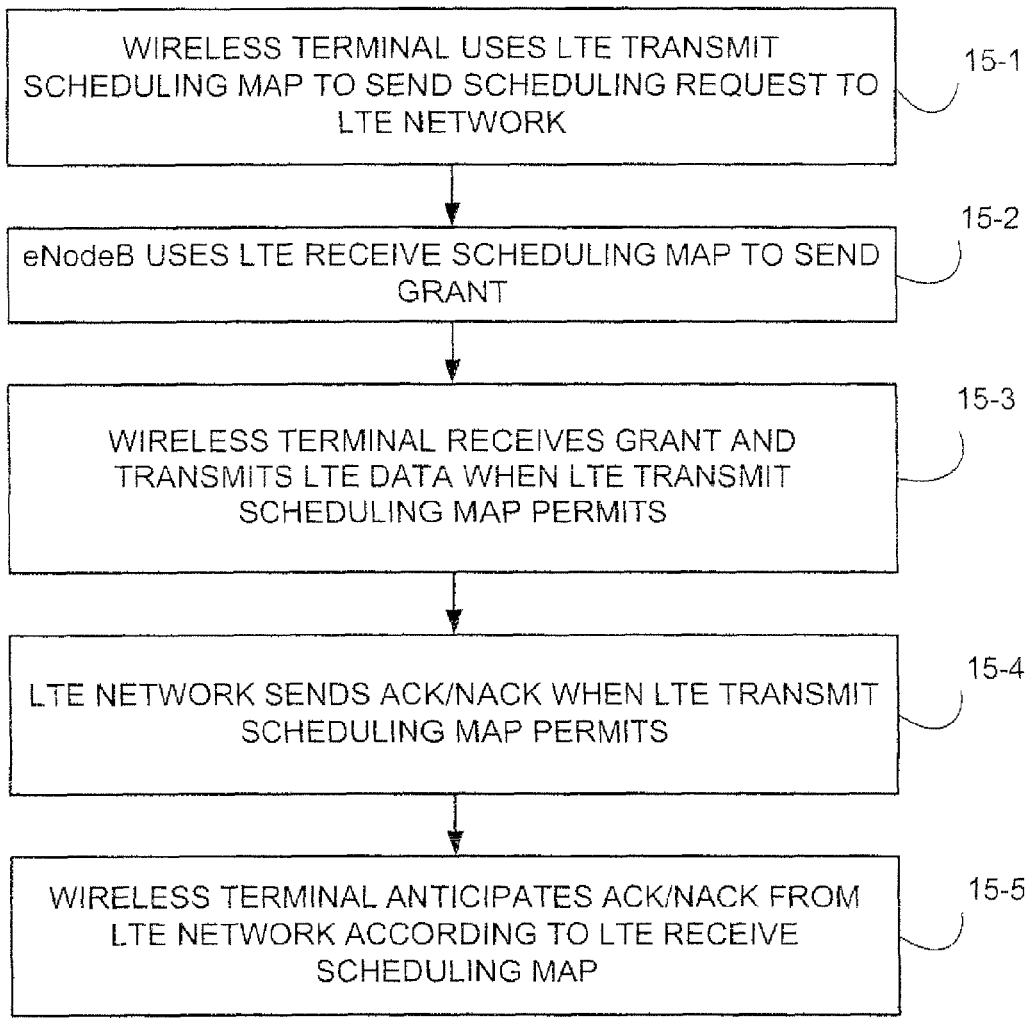
FIG. 15 is a flowchart showing basic, representative acts performed when using a scheduling map for scheduling transmissions between a wireless terminal and the Long Term Evolution (LTE).

In case the wireless terminal has a large amount of data to send over LTE, the wireless terminal will send a buffer status report (BSR). The buffer status report (BSR) triggers the LTE network to grant the wireless terminal the right to send LTE data in subsequent/following TTIs without the wireless terminal have to send a new scheduling request (SR), as illustrated in FIG. 15.

When in GSM and LTE time multiplexing and the wireless terminal LTE RX and wireless terminal LTE TX scheduling maps are in use, the grants must be sent according to the wireless terminal LTE RX scheduling map. But the amount of grants sent should not be more than possible transmissions indicated in the wireless terminal LTE TX scheduling map. In case of a dual receiver wireless terminal and a wireless terminal LTE RX scheduling map indicating the possibility to receive LTE data or control in every TTI, the eNodeB could send grants in every TTI. But this would be a waste since the wireless terminal can only send data for a certain percentage of these grants according to the wireless terminal LTE TX scheduling map.

Hence, the LTE radio access network 22-1 should not grant the transmission of data in more LTE TTIs than the minimum of (a) the number of LTE TTIs that can be used for transmission and (b) the number of LTE TTIs that can be used for LTE reception.

In embodiments in which the network 22-2 is a Global System for Mobile Communication (GSM) network, the GSM network is happily unaware of what occurs in the wireless terminal 30 and in the LTE network, e.g., node 28-1. By allowing the Global System for Mobile Communication (GSM) system to be essentially obvious to the scheduling coordinated between wireless terminal 30 and the LTE network 22-1, the GSM system with its legacy components advantageously need not upgraded or otherwise impacted by the introduction of Long Term Evolution (LTE) and access division multiplexing (ADM). Hence GSM does its own scheduling and transmission independently. Moreover, the GSM frame structure—being circuit switched with regular transmissions of voice frames—is very rigid and hence unsuited for the flexibility required to follow any scheduling map, in particular with constraints that other GSM wireless terminals (GSM only legacy wireless terminals) shall be able to be scheduled according to old patterns in the same frequency and in parallel to the ADM/GSM mobile.

The technology disclosed herein thus encompasses numerous aspects and features, some of which have been described with reference to the foregoing embodiments and modes. It should be understood that each embodiment and mode does not necessarily exist in isolation, but that features or aspects of differing embodiments and modes can be combined with one another. For example, the technology of a 60/120-multiple TTI length scheduling map can be combined with the technology of multi-input dependency and/or the technology of adaptively regenerability, or yet other variations and combinations. Moreover, as emphasized above each embodiment can use multi-directional scheduling maps (e.g., can employ both an uplink (UL) scheduling map and a downlink (DL) scheduling map).

Among the features described herein or encompassed hereby are the following:

a wireless terminal that derives scheduling maps each of the length of a multiple of 60 or 120 LTE TTIs for multiplexing LTE and GSM transmissions/receptions.

A wireless terminal that derives scheduling maps using some or all of the multiple input information described herein.

A wireless terminal that derives two scheduling maps one for when it can send LTE TTIs and one for when it can receive LTE TTIs, and which sends this information (the two scheduling maps) to the LTE network.

A LTE radio access network (RAN) that derives scheduling maps each of the length of a multiple of 60 or 120 LTE TTIs for the use of multiplexing LTE and GSM transmissions/receptions.

A LTE radio access network (RAN) that derives scheduling maps using some or all of the information mentioned herein, at least some of which it has received from the wireless terminal (maybe only parts of the information is received from the wireless terminal).

A LTE radio access network (RAN) that receives input parameters from the wireless terminal and uses the input parameters to derive two scheduling maps: one for when the wireless terminal can send LTE TTIs and one for when the wireless terminal can receive LTE TTIs.

A wireless terminal that takes the wireless terminal LTE TX scheduling map into account when deciding the TTI to send a scheduling request (SR).

A LTE radio access network (RAN) that takes the wireless terminal LTE RX scheduling map into account when deciding when to grant the wireless terminal to send data in the uplink (UL).

A wireless terminal and a LTE radio access network (RAN) that take the wireless terminal LTE TX scheduling map into account to calculate when the LTE UL data transmission can occur depending on when the grant was sent and the wireless terminal LTE TX scheduling map.

A wireless terminal and a LTE radio access network (RAN) that takes into account the wireless terminal LTE RX scheduling map to calculate when the ACK/NACK of the LTE UL data transmission can occur (this depends on when the LTE UL transmission was sent and the wireless terminal LTE RX scheduling map).

A LTE radio access network (RAN) that, when receiving a buffer status report (BSR) when in GSM and LTE multiplexing, takes into account both the wireless terminal LTE RX and wireless terminal LTE TX scheduling map when deciding which TTIs the wireless terminal can use for LTE transmissions. The LTE RAN does not grant transmission of data in more LTE TTIs than the minimum of (1) the number of LTE TTIs that can be used for transmission and (2) the number of LTE TTIs that can be used for LTE reception.

A wireless terminal that recalculates the scheduling maps when any of the input parameters are changed.

A wireless terminal that either sends the recalculated scheduling maps to the LTE RAN or sends the changed input parameters A LTE network that, if it receives changed input parameters, recalculates the scheduling maps.

Example advantages of this technology include the addition of functionality to derive wireless terminal LTE RX and wireless terminal LTE TX scheduling maps describing when LTE data transmissions can happen in-between GSM voice transmissions. This technology also addresses issues with the fixed timing in the LTE uplink scheduling resulting in a significantly larger LTE throughput when multiplexing LTE data transport in a GSM circuit switched (CS) call.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. Apparatus configured for interleaved transmissions over a radio interface with both a circuit switched (CS) Global System for Mobile Communication (GSM) network and Long Term Evolution (LTE) network, the apparatus being configured to generate a scheduling map, the scheduling map being configured to inform at least one of the circuit switched (CS) Global System for Mobile Communication (GSM) network and the Long Term Evolution (LTE) network of time intervals that can be used for data transmissions to or from the wireless terminal;
   a communication interface configured to facilitate the interleaved transmissions over the radio interface;
   a scheduling map generator configured to generate the scheduling map, wherein a length of the scheduling map is a multiple of sixty or one hundred twenty transmission time intervals of the Long Term Evolution (LTE) network.

2. The apparatus of claim 1, further comprising:
   a communications handler configured to operate in accordance with the scheduling map for processing the interleaved transmissions.

3. The apparatus of claim 1, wherein the apparatus comprises a node of a radio access network.

4. The apparatus of claim 1, wherein the apparatus comprises a wireless terminal which communicates over the radio interface with a node of a radio access network.

5. A method of generating a scheduling map for use in a radio access network, the method comprising:
   configuring the scheduling map to prescribe time intervals that can be used for interleaved transmissions over a radio interface to or from a wireless terminal, the interleaved transmissions to or from the wireless terminal being interleaved with respect to a circuit switched (CS) Global System for Mobile Communication (GSM) network and a Long Term Evolution (LTE) network;
   setting a length of the scheduling map to be a multiple of sixty or one hundred twenty transmission time intervals of the Long Term Evolution (LTE) network.

6. The method of claim 5, further comprising generating the scheduling map at a node of a radio access network.

7. The method of claim 5, further comprising generating the scheduling map at the wireless terminal.

8. Apparatus configured for interleaved transmissions over a radio interface with both a circuit switched (CS) Global System for Mobile Communication (GSM) network and Long Term Evolution (LTE) network, the apparatus being configured to generate a scheduling map, the scheduling map being configured to inform at least one of the circuit switched (CS) Global System for Mobile Communication (GSM) network and the Long Term Evolution (LTE) network of time intervals that can be used for data transmissions to or from the wireless terminal;
   wherein the apparatus is configured to generate the scheduling map using two or more of the following variables or parameters:
      an offset delay between transmission time intervals of the Long Term Evolution (LTE) network and a start of a GSM traffic multi-frame;
      a guard delay required by at least one of hardware and software of the wireless terminal to move from a GSM transmit operation to a LTE receive or from a GSM receive operation to a LTE transmit operation;
      a time slot number used for GSM voice transmissions both in an uplink (UL) communication across the radio interface from the wireless terminal and a downlink (DL) communication across the radio interface toward the wireless terminal;
      a GSM time delay difference between uplink (UL) and downlink (DL) timeslots; and
      an indication whether a half rate or a full rate codec is used.

9. The apparatus of claim 8, wherein the apparatus comprises a node of a radio access network.

10. The apparatus of claim 8, wherein the apparatus comprises a wireless terminal which communicates over the radio interface with a node of a radio access network.

11. The apparatus of claim 8, wherein the apparatus is configured to regenerate at least a portion of the scheduling map when there is change of the one or more of the variables or parameters.

12. The apparatus of claim 11, wherein where there is the change of the one or more of the variables or parameters the wireless terminal is configured to send either a regenerated scheduling map or a changed variable or parameter to a node of a radio access network.

13. The apparatus of claim 8, further comprising:
   a communications interface configured to facilitate the interleaved transmissions over the radio interface;
   a scheduling map generator configured to generate the scheduling map.

14. A method of generating a scheduling map configured to prescribe time intervals that can be used for interleaved transmissions over a radio interface to or from a wireless terminal, the interleaved transmissions to or from the wireless terminal being interleaved with respect to a circuit switched (CS) Global System for Mobile Communication (GSM) network and a Long Term Evolution (LTE) network;
   the method comprising generating the scheduling map using two or more of the following variables or parameters:
      an offset delay between transmission time intervals of the Long Term Evolution (LTE) network and a start of a GSM traffic multi-frame;
      a guard delay utilized by at least one of hardware and software of the wireless terminal to move from a GSM transmit operation to a LTE receive or from a GSM receive operation to a LTE transmit operation;
      a time slot number used for GSM voice transmissions both in an uplink (UL) communication across the radio interface from the wireless terminal and a downlink (DL) communication across the radio interface toward the wireless terminal;
      a GSM time delay difference between uplink (UL) and downlink (DL) timeslots; and
      an indication whether a half rate or a full rate codec is used.

15. The method of claim 14, further comprising regenerating at least a portion of the scheduling map when there is change of one or more of the variables or parameters.

16. The method of claim 9, further comprising acquiring at least one of the variables or parameters by a node of a radio access network from the wireless terminal.

* * * * *